US012363602B2

United States Patent
Akl et al.

(10) Patent No.: US 12,363,602 B2
(45) Date of Patent: Jul. 15, 2025

(54) MIGRATION OF AN INTEGRATED ACCESS AND BACKHAUL NODE

(71) Applicant: QUALCOMM Incorporated, San Diego, CA (US)

(72) Inventors: Naeem Akl, Somerville, NJ (US); Karl Georg Hampel, Hoboken, NJ (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 703 days.

(21) Appl. No.: 17/447,394

(22) Filed: Sep. 10, 2021

(65) Prior Publication Data

US 2022/0086718 A1    Mar. 17, 2022

Related U.S. Application Data

(60) Provisional application No. 62/706,854, filed on Sep. 14, 2020.

(51) Int. Cl.
*H04W 36/08* (2009.01)
(52) U.S. Cl.
CPC ................................ *H04W 36/087* (2023.05)
(58) Field of Classification Search
CPC ... H04W 36/08; H04W 36/10; H04W 36/087; H04W 36/083; H04W 36/085; H04W 36/13
See application file for complete search history.

(56) References Cited

U.S. PATENT DOCUMENTS

2023/0232285 A1*   7/2023   Barac ................ H04W 36/0088
                                                          370/331

OTHER PUBLICATIONS

CATT ("Group Handover in Inter IAB donor-CU", 3GPP TSG-RAN3 Meeting #109-e, R3-204733, Aug. 17-28, 2020) (Year: 2020).*
Zte, Sanechips ("Discussion on inter-donor IAB-node migration procedure", 3GPP TSG-RAN WG3 #109-e, R3-205162, Aug. 17-28, 2020) (Year: 2020).*
63040553, Specification, Jun. 18, 2020 (Year: 2020).*
Samsung ("Discussion on inter-donor IAB node migration", 3GPP TSG-RAN WG3 #109-e, R-205411, Aug. 17-28, 2020) (Year: 2020).*

* cited by examiner

*Primary Examiner* — Ji-Hae Yea
(74) *Attorney, Agent, or Firm* — Arun Swain

(57) ABSTRACT

Various aspects of the present disclosure generally relate to wireless communication. In some aspects, a first integrated access and backhaul (IAB) donor central unit (CU) may transmit, to a second IAB donor CU, a resource configuration of a first cell served by an IAB node to initiate a migration of the IAB node from a first parent node to a second parent node serving a second cell associated with the second IAB donor CU. The first IAB donor CU may receive, from the second IAB donor CU, an indication that communications performed by the IAB node associated with the first cell will not conflict with communications with the second parent node serving the second cell. The first IAB donor CU may migrate the IAB node to the second parent node based at least in part on the indication. Numerous other aspects are described.

30 Claims, 12 Drawing Sheets

MIGRATION OF AN INTEGRATED ACCESS AND BACKHAUL NODE

CROSS-REFERENCE TO RELATED APPLICATION

This Patent Application claims priority to U.S. Provisional Patent Application No. 62/706,854, filed on Sep. 14, 2020, entitled "MIGRATION OF AN INTEGRATED ACCESS AND BACKHAUL NODE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for migration of an integrated access and backhaul node.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first integrated access and backhaul (IAB) donor central unit (CU) includes transmitting, to a second IAB donor CU, a resource configuration of a first cell served by an IAB node, to initiate a migration of the IAB node from a first parent node to a second parent node serving a second cell associated with the second IAB donor CU; receiving, from the second IAB donor CU and based at least in part on the resource configuration, an indication that communications performed by the IAB node associated with the first cell will not conflict with communications with the second parent node serving the second cell; and migrating the IAB node to the second parent node based at least in part on the indication.

In some aspects, a method of wireless communication performed by a first IAB donor CU includes receiving, from a second IAB donor CU, a resource configuration of a second cell served by an IAB node to initiate a migration of the IAB node from a second parent node to a first parent node serving a first cell associated with the first IAB donor CU; and transmitting, to the second IAB donor CU and based at least in part on the resource configuration, an indication that communications of the IAB node associated with the second cell will not conflict with communications to be performed with the first parent node serving the first cell.

In some aspects, a first IAB donor CU includes a memory and one or more processors, coupled to the memory, configured to: transmit, to a second IAB donor CU, a resource configuration of a first cell served by an IAB node to initiate a migration of the IAB node from a first parent node to a second parent node serving a second cell associated with the second IAB donor CU; receive, from the second IAB donor CU and based at least in part on the resource configuration, an indication that communications performed by the IAB node associated with the first cell will not conflict with communications with the second parent node serving the second cell; and migrate the IAB node to the second parent node based at least in part on the indication.

In some aspects, a first IAB donor CU includes a memory and one or more processors, coupled to the memory, configured to: receive, from a second IAB donor CU, a resource configuration of a second cell served by an IAB node to initiate a migration of the IAB node from a second parent node to a first parent node serving a first cell associated with the first IAB donor CU; and transmit, to the second IAB donor CU and based at least in part on the resource configuration, an indication that communications of the IAB node associated with the second cell will not conflict with communications to be performed with the first parent node serving the first cell.

In some aspects, a non-transitory computer-readable medium storing a set of instructions for wireless communication includes one or more instructions that, when executed by one or more processors of a first IAB donor CU, cause the first IAB donor CU to: transmit, to a second IAB donor CU, a resource configuration of a first cell served by an IAB node to initiate a migration of the IAB node from a first parent node to a second parent node serving a second cell associated with the second IAB donor CU; receive, from the second IAB donor CU and based at least in part on the resource configuration, an indication that communications performed by the IAB node associated with the first cell will not conflict with communications with the second parent node serving the second cell; and migrate the IAB node to the second parent node based at least in part on the indication.

In some aspects, a non-transitory computer-readable medium storing a set of instructions for wireless communication includes one or more instructions that, when executed by one or more processors of a first IAB donor CU, cause the first IAB donor CU to: receive, from a second IAB donor CU, a resource configuration of a second cell served by an IAB node to initiate a migration of the IAB node from a second parent node to a first parent node serving a first cell associated with the first IAB donor CU; and transmit, to the second IAB donor CU and based at least in part on the resource configuration, an indication that communications of the IAB node associated with the second cell will not conflict with communications to be performed with the first parent node serving the first cell.

In some aspects, a first apparatus for wireless communication includes means for transmitting, to a second apparatus, a resource configuration of a first cell served by an IAB node to initiate a migration of the IAB node from a first parent node to a second parent node serving a second cell associated with the second apparatus; means for receiving, from the second apparatus and based at least in part on the resource configuration, an indication that communications performed by the IAB node associated with the first cell will not conflict with communications with the second parent node serving the second cell; and means for migrating the IAB node to the second parent node based at least in part on the indication.

In some aspects, a first apparatus for wireless communication includes means for receiving, from a second apparatus, a resource configuration of a second cell served by an IAB node to initiate a migration of the IAB node from a second parent node to a first parent node serving a first cell associated with the first apparatus; and means for transmitting, to the second apparatus and based at least in part on the resource configuration, an indication that communications of the IAB node associated with the second cell will not conflict with communications to be performed with the first parent node serving the first cell.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
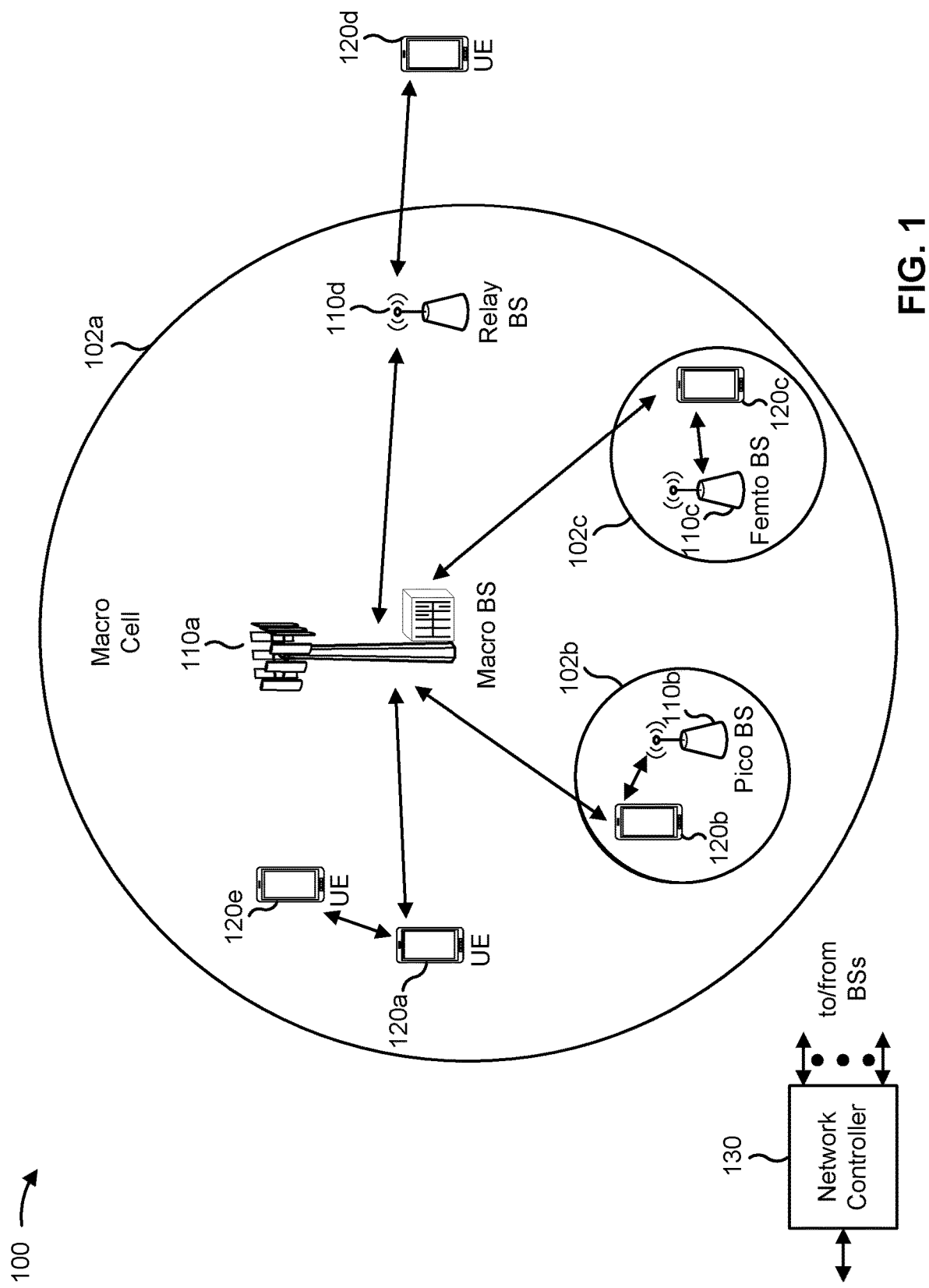
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
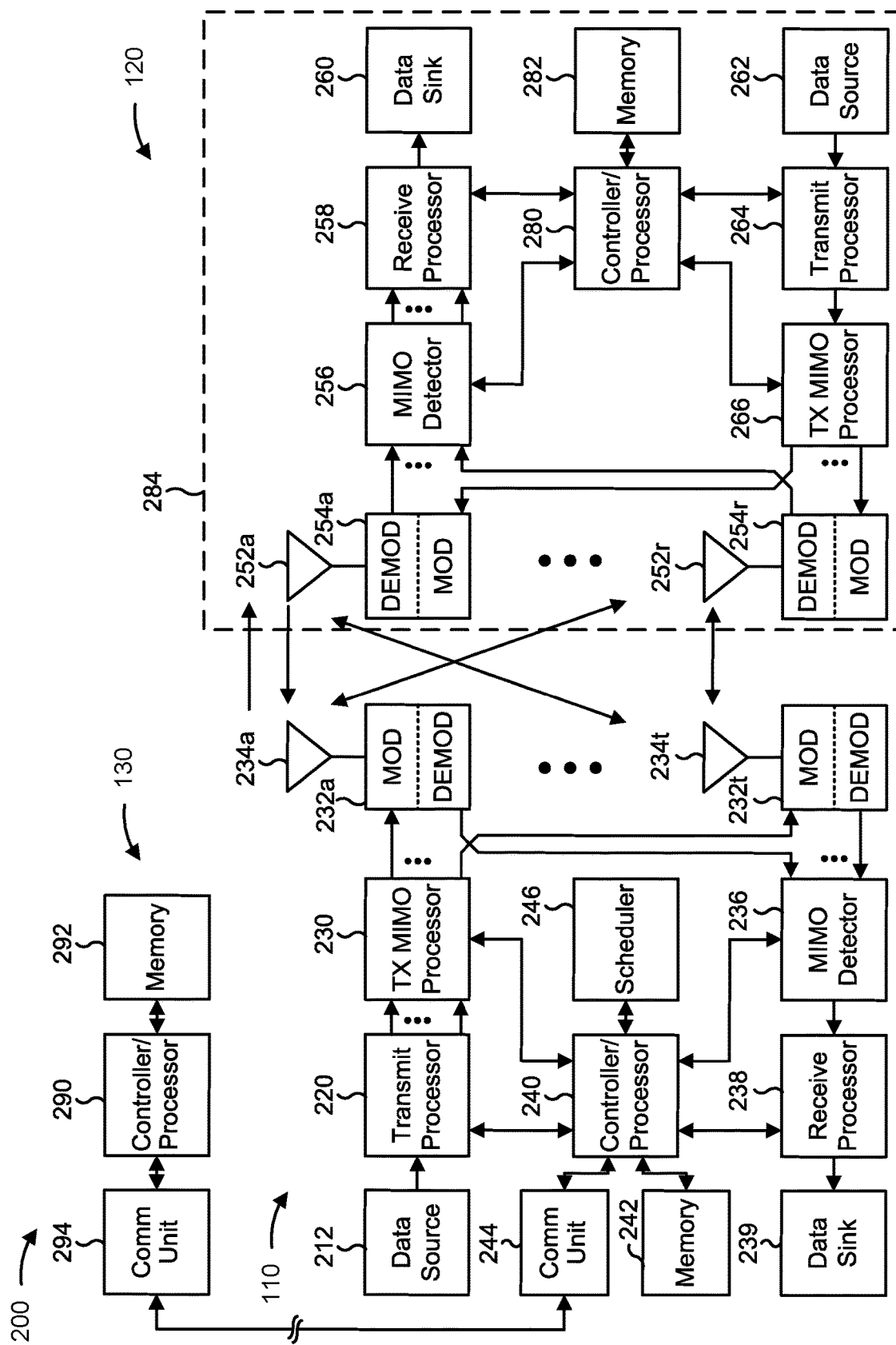
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-12).

The controller/processor 240 of the base station 110, the controller/processor 280 of the UE 120, and/or any other component(s) of FIG. 2 may perform one or more techniques associated with migration of an integrated access and backhaul node as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a first IAB donor CU (e.g., associated with base station 110b) may include means for transmitting, to a second IAB donor CU, a resource configuration of a first cell served by an IAB node to initiate a migration of the IAB node from a first parent node to a second parent node serving a second cell associated with the second IAB donor CU. The first IAB donor CU may include means for receiving, from the second IAB donor CU and based at least in part on the resource configuration, an indication that communications performed by the IAB node associated with the first cell will not conflict with communications with the second parent node serving the second cell. The first IAB donor CU may include means for migrating the IAB node to the second parent node based at least in part on the indication. The means for the first IAB donor CU to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the second IAB donor CU may include means for receiving, from the first IAB donor CU, a resource configuration of a first cell served by an IAB node to initiate a migration of the IAB node from a first parent node to a second parent node serving a second cell associated with the second IAB donor CU. The second IAB donor CU may include means for transmitting, to the first IAB donor CU and based at least in part on the resource configuration, an indication that communications of the IAB node associated with the first cell will not conflict with communications to be performed with the second parent node serving the second cell. The means for the second IAB donor CU to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
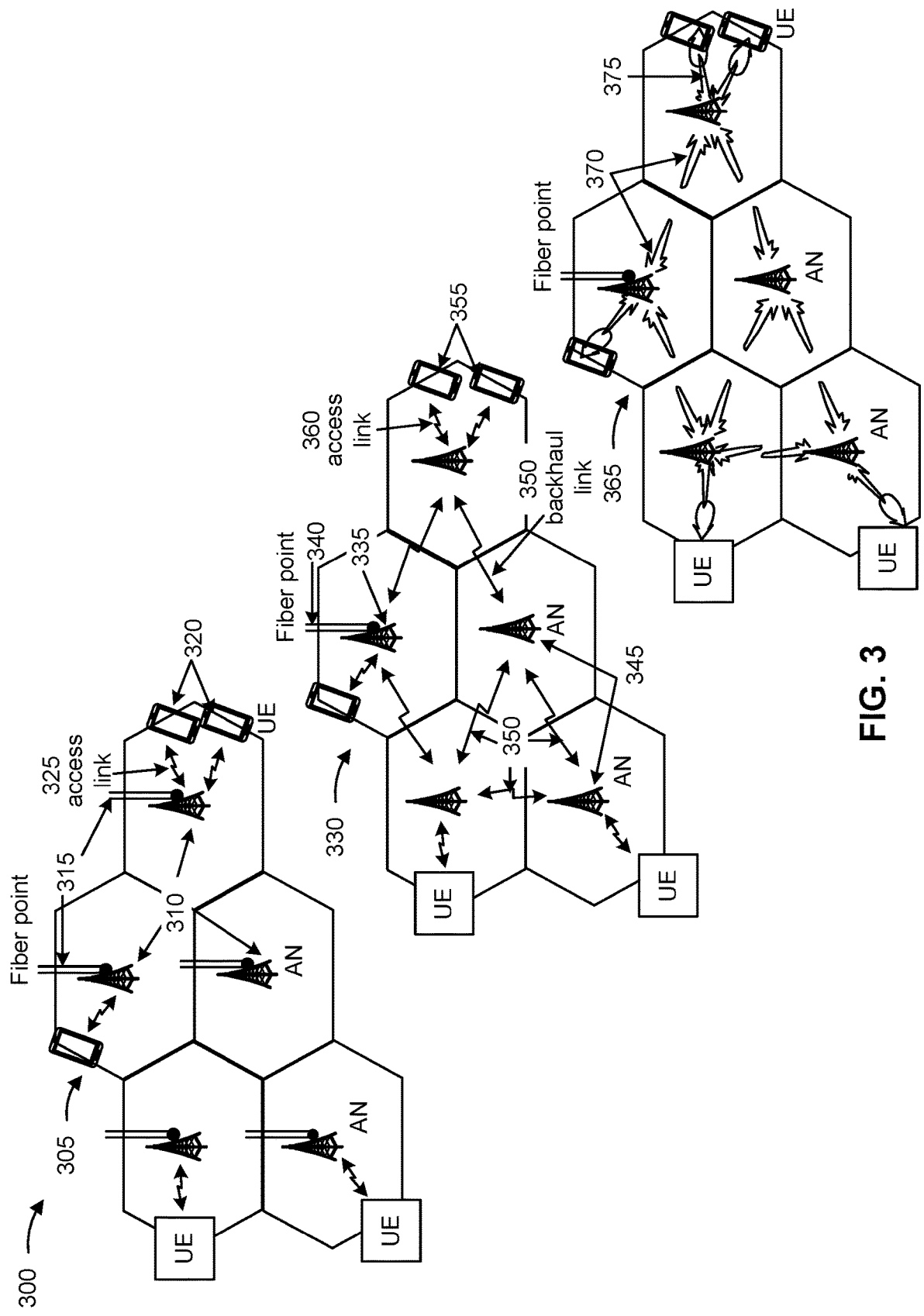
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, and/or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, or a device-to-device network). In this case, "anchor node" may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
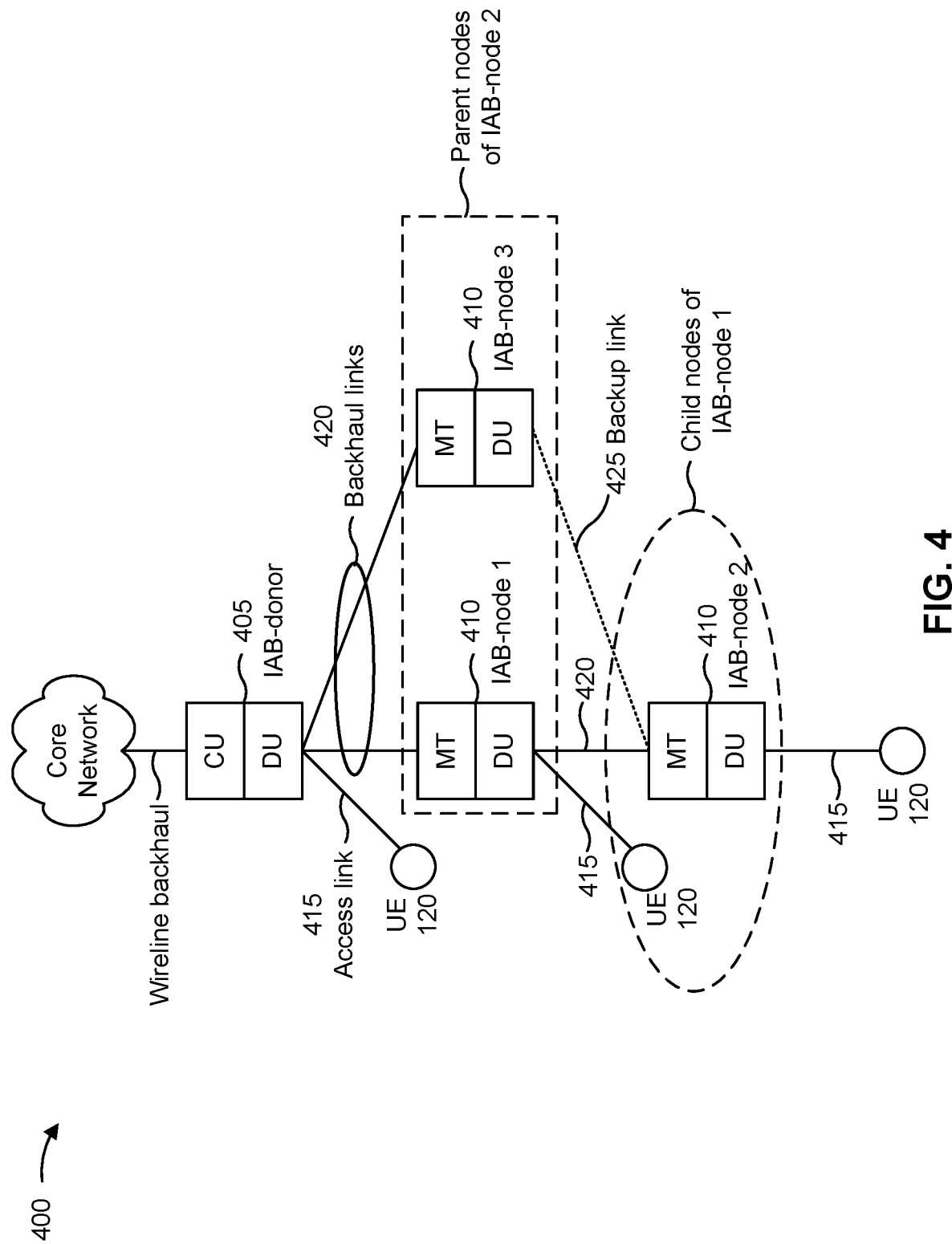
FIG. 4 is a diagram illustrating an example of an integrated access and backhaul (IAB) network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with 3. As shown, an IAB donor 405 may include a central unit (CU), which may perform access node controller (ANC) functions, and/or AMF functions. The CU may configure a distributed unit (DU) of the IAB donor 405 and/or may configure one or more IAB nodes 410 (e.g., a mobile termination (MT) and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message, and/or an F1 application protocol (F1AP) message). An IAB node may function as a Layer 2 relay for traffic transported via an IAB network configured or managed by a CU.

A CU (whether associated with an IAB donor or a gNB) may perform RRC layer functions and packet data convergence protocol (PDCP) functions. A DU may act as a scheduling node that schedules child nodes of a network node associated with the DU. For example, the DU may perform radio link control (RLC), medium access control (MAC), and physical (PHY) layer functions.

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded. For example, a backup link 425 between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

As indicated above, FIG. 4 is provided as an example. Other examples may differ from what is described with regard to FIG. 4.

Figure 5:
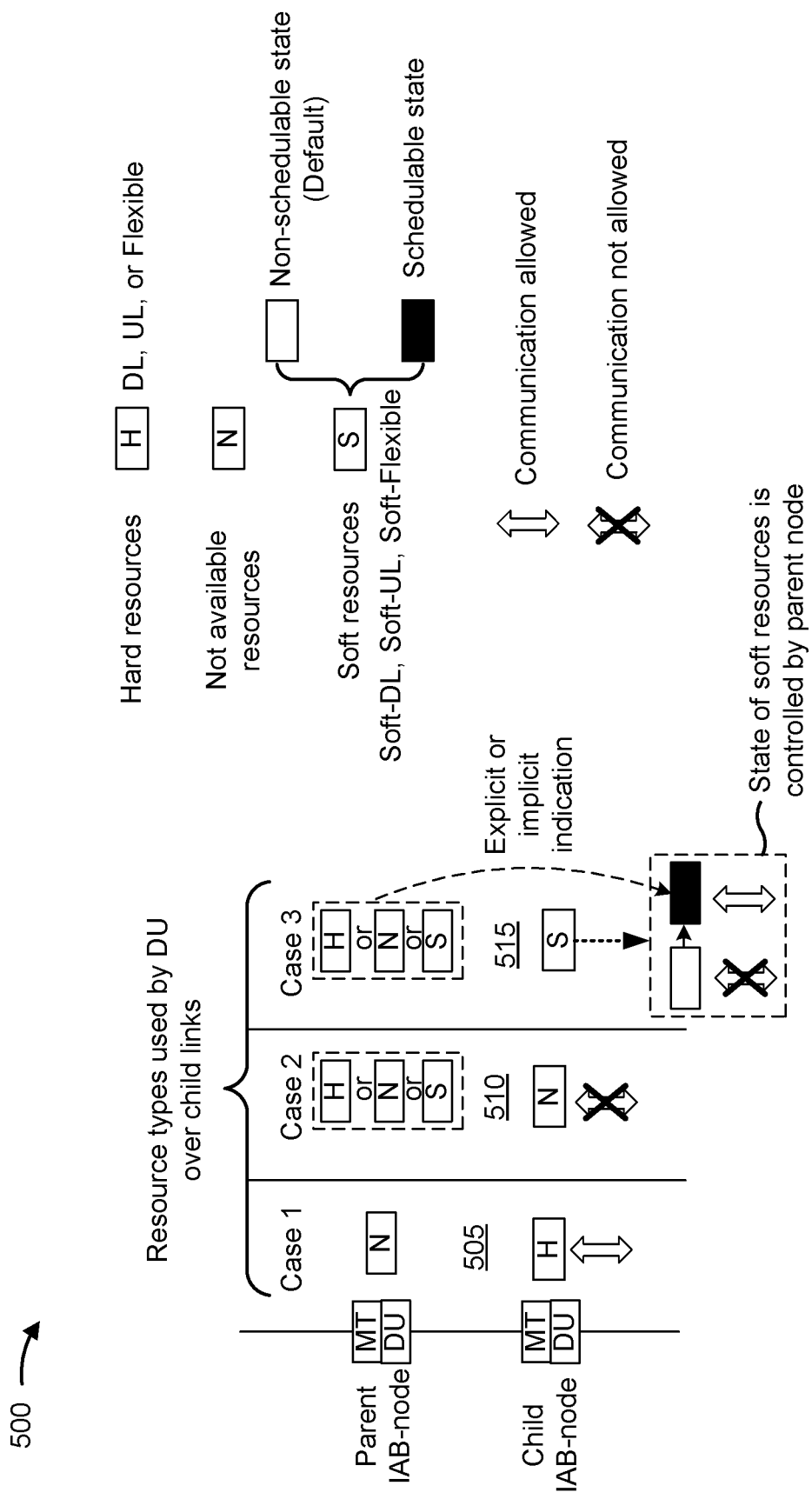
FIG. 5 is a diagram illustrating an example of resource types in an IAB network, in accordance with the present disclosure.

FIG. 5 is a diagram illustrating an example 500 of resource types in an IAB network, in accordance with the present disclosure.

In an IAB network, time domain resources (sometimes referred to as time resources) may be configured as downlink-only, uplink-only, flexible, or not available (e.g., NA, unavailable). For example, time domain resources may be configured via a DU cell resource configuration, such as a gNB-DU cell resource configuration, as described in more detail in connection with FIG. 6. When a time resource is configured as downlink-only for a wireless node, that time resource may be available for only downlink communications of the wireless node, and not uplink communications. Similarly, when a time resource is configured as uplink-only for a wireless node, that time resource may be available for only uplink communications of the wireless node, and not downlink communications. When a time resource is configured as flexible for a wireless node, that time resource may be available for both downlink communications and uplink communications of the wireless node. When a time resource is configured as not available for a wireless node, that time resource may not be used for any communications of the wireless node.

Examples of downlink communications include synchronization signal blocks (SSBs) (both cell defining SSBs (CD-SSBs) and non-CD-SSBs), channel state information reference signals (CSI-RSs), physical downlink control channel (PDCCH) communications, and/or physical downlink shared channel (PDSCH) communications. Examples of uplink communications include physical random access channel (PRACH) communications, physical uplink control channel (PUCCH) communications, physical uplink shared channel (PUSCH) communications, and/or sounding reference signals (SRSs).

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

When a time resource is configured as a soft resource for a wireless node, the availability of that time resource is controlled by a parent node of the wireless node. For example, the parent node may indicate (e.g., explicitly or implicitly) whether a soft time resource is available for communications of the wireless node. Thus, a soft time resource may be in one of two states: a schedulable state (e.g., when the soft time resource is available for scheduling and/or communications of the wireless node) and a nonschedulable state (e.g., when the soft time resource is not available for scheduling and is not available for communications of the wireless node).

For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available.

As an example, and as shown by reference number 505, a time resource may be configured as hard for a child node, and may be configured as not available for a parent node of the child node. In this case, the parent node cannot communicate using that time resource, but the child node can schedule communications in that time resource and/or communicate using that time resource. This configuration may reduce interference between the parent node and the child node, and/or may reduce scheduling conflicts between the parent node and the child node.

As another example, and as shown by reference number 510, a time resource may be configured as not available for the child node, and may be configured as hard, soft, or not available for the parent node (e.g., depending on a network configuration, network conditions, and/or a configuration of a parent node of the parent node). In this case, the child node cannot schedule communications in that time resource and cannot communicate using that time resource.

As another example, and as shown by reference number 515, a time resource may be configured as soft for the child node, and may be configured as hard, soft, or not available for the parent node (e.g., depending on a network configuration, network conditions, and/or a configuration of a parent node of the parent node). In this case, the child node cannot schedule or communicate using the time resource unless the child node receives an indication (e.g., a release indication), from the parent node (e.g., explicitly or implicitly), that the time resource is available (i.e., released) for use by the child node. If the child node receives such an indication, then the child node can schedule communications in that time resource and/or communicate using that time resource.

As indicated above, FIG. 5 is provided as an example. Other examples may differ from what is described with regard to FIG. 5.

Figure 6:
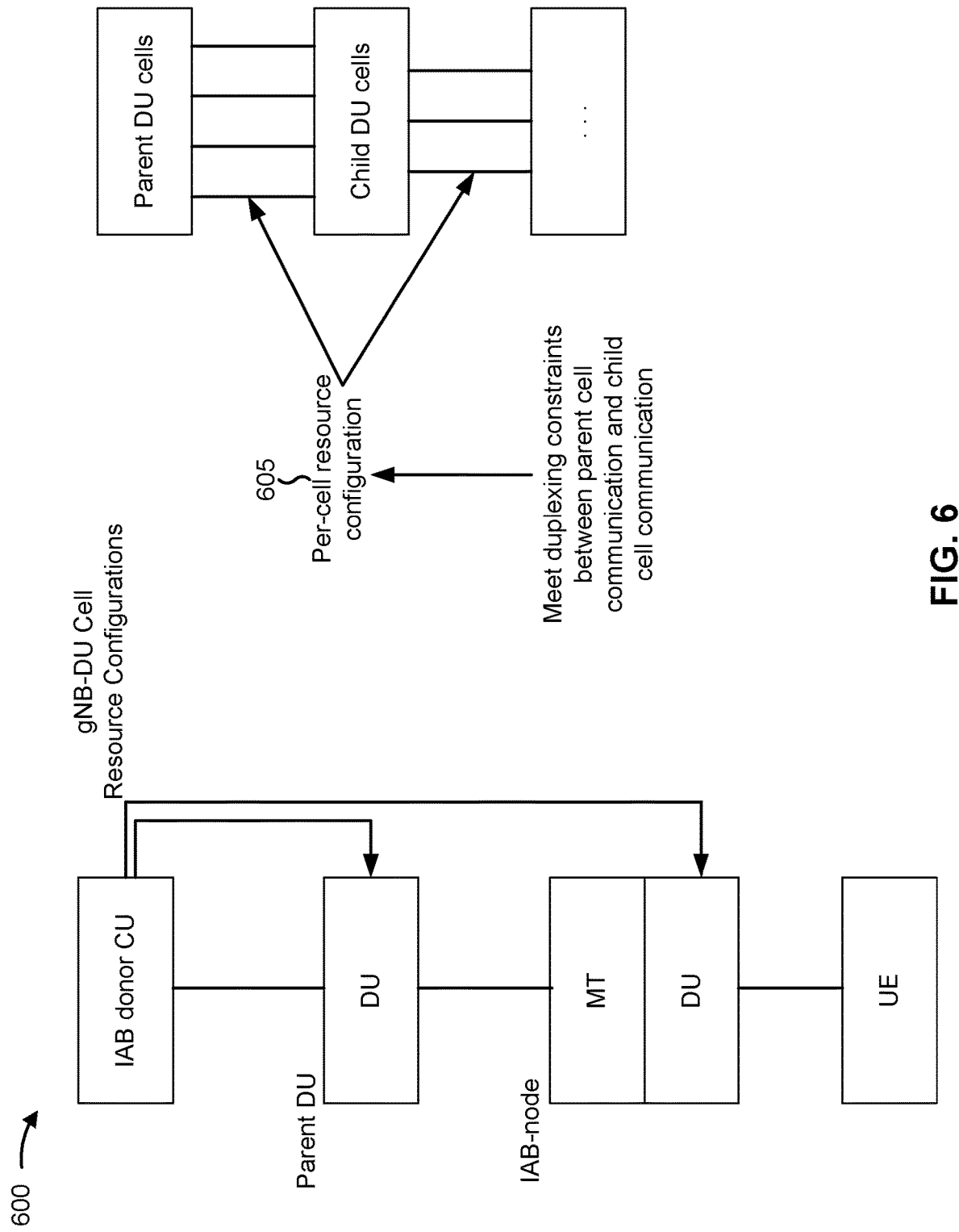
FIG. 6 is a diagram illustrating an example of distributed unit (DU) cell resource configuration for IAB, in accordance with the present disclosure.

FIG. 6 is a diagram illustrating an example 600 of DU cell resource configuration for IAB, in accordance with the present disclosure. Example 600 includes an IAB-donor CU. The IAB-donor CU may be associated with a gNB. The IAB-donor CU may handle resource configuration for the parent DU and the IAB node. Thus, the IAB-donor CU may accommodate half-duplex constraints of the parent DU, the IAB node, and/or other nodes of the IAB network.

The IAB-donor CU may provide a resource configuration via a cell resource configuration, shown as "gNB-DU cell resource configuration." In some aspects, as shown by reference number 605, the cell resource configuration may be specific to a cell. For example, the IAB-donor CU may provide a respective cell resource configuration for each cell served by a DU. The cell resource configuration may indicate at least part of the information described with regard to FIG. 5.

The term "cell" may refer to a logical communication entity used for communication with a base station (e.g., over a carrier), and may be associated with an identifier for distinguishing neighboring cells operating via the same or a different carrier. In some examples, the cells may support different service and/or device types (e.g., MTC, narrowband Internet-of-Things (NB-IoT), enhanced mobile broadband (eMBB), ultra-reliable low-latency (URLLC) communications, and/or others). In some cases, the term "cell" may refer to a portion of a geographic coverage area (e.g., a sector) over which the logical entity operates. A cell may be referred to as "served by" a DU if the DU handles scheduling for communications via the cell.

A cell may have a cell global identifier (CGI), such as an NR CGI (NCGI). The NCGI uniquely identifies the cell. The NCGI includes a public land mobile network (PLMN) identifier and an NR cell identifier. The PLMN identifier (which may include 24 bits) may include an MCC (e.g., 12 bits) and an MNC (e.g., 12 bits). The NCI (e.g., 36 bits in 5G) may include a gNB identifier (e.g., a leftmost 22 to 32 bits) and a local cell identifier (e.g., the remaining bits of the NCI). The gNB may be unique within a gNB, and may be common for all cells (e.g., all IAB-donor DUs and all IAB-node DUs) served by the gNB with one IAB-donor CU. Equivalently, the PLMN and gNB ID may globally identify a gNB.

As indicated above, FIG. 6 is provided as an example. Other examples may differ from what is described with regard to FIG. 6.

Figure 7:
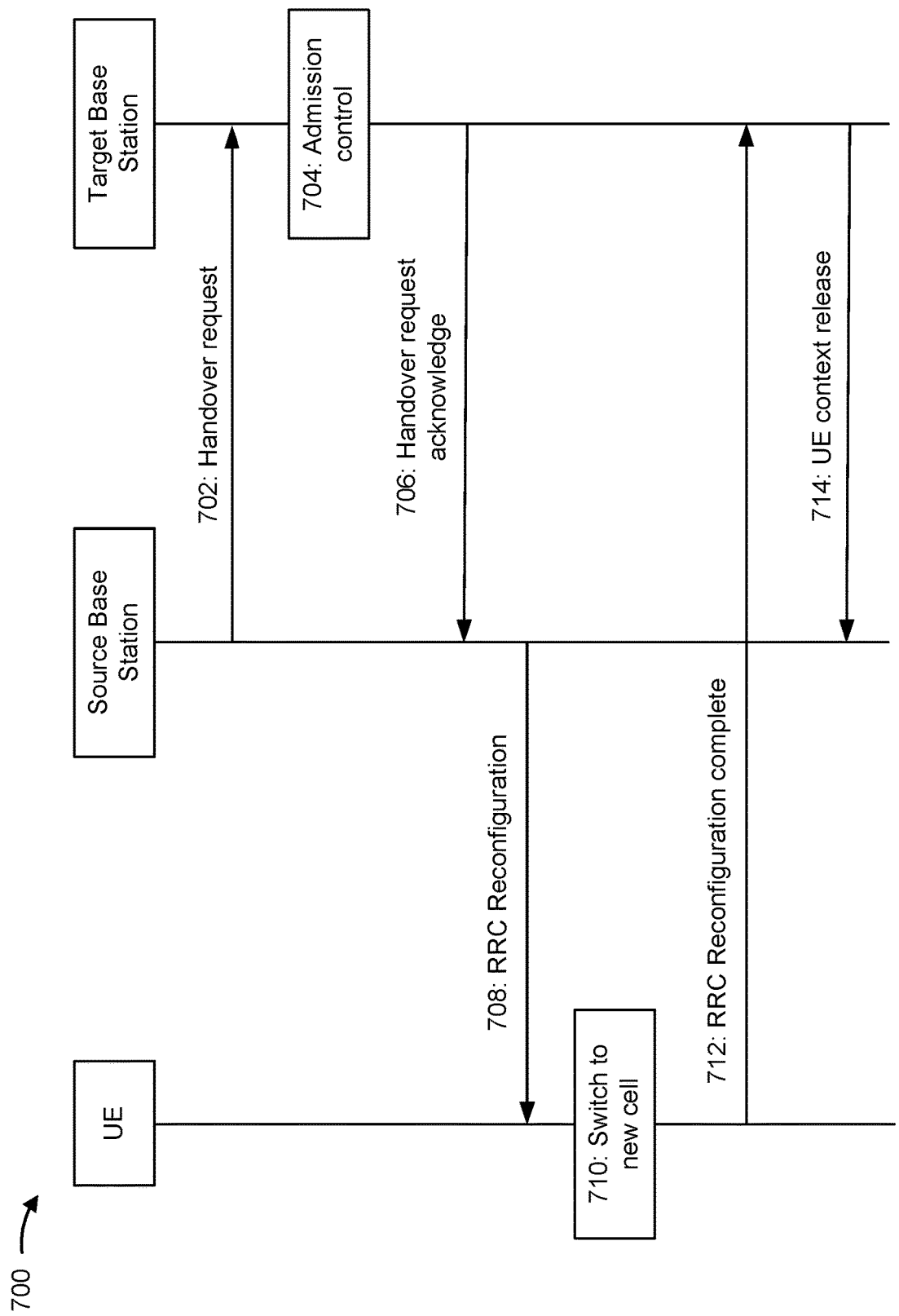
FIG. 7 is a diagram illustrating an example of an inter-gNodeB (gNB) handover of a UE, in accordance with the present disclosure.

FIG. 7 is a diagram illustrating an example 700 of an inter-gNB handover of a UE, in accordance with the present disclosure. As shown in FIG. 7, example 700 includes communication between a UE (e.g., UE 120*b*), a source base station (e.g., base station 110*b*), and a target base station (e.g., base station 110*c*). In some aspects, the UE, the source base station, and the target base station may be included in a wireless network such as wireless network 100. The UE, the source base station, and the target base station may communicate on a wireless sidelink.

As shown by reference number 702, the source base station may initiate a handover of the UE by transmitting a handover request to the target base station. The handover request may be transmitted over an Xn interface between the source base station and the target base station.

As shown by reference number 704, the target base station may perform an admission control and generate a new RRC configuration. The new RRC configuration may enable the UE to be handed over from the source base station to the target base station.

As shown by reference number 706, the target base station may transmit a handover request acknowledge message to the source base station. The handover request acknowledge message may include an RRC reconfiguration message with the new RRC configuration.

As shown by reference number 708, the source base station may forward the RRC reconfiguration message with the new RRC configuration to the UE. In other words, the source base station may transmit the new RRC configuration to the UE by forwarding the RRC reconfiguration message received from the target base station in the handover request acknowledge message.

As shown by reference number 710, the UE may switch from the source base station to the target base station by moving an existing RRC connection with the source base station to the target base station.

As shown by reference number 712, the UE may transmit an RRC reconfiguration complete message to the target base station. The UE may transmit the RRC reconfiguration complete message to the target base station after switching from the source base station to the target base station.

As shown by reference number 714, the target base station may transmit a UE context release message to the source base station. The context release message may indicate to the source base station that the UE has been successfully handed over from the source base station to the target base station.

As indicated above, FIG. 7 is provided as an example. Other examples may differ from what is described with regard to FIG. 7.

Figure 8:
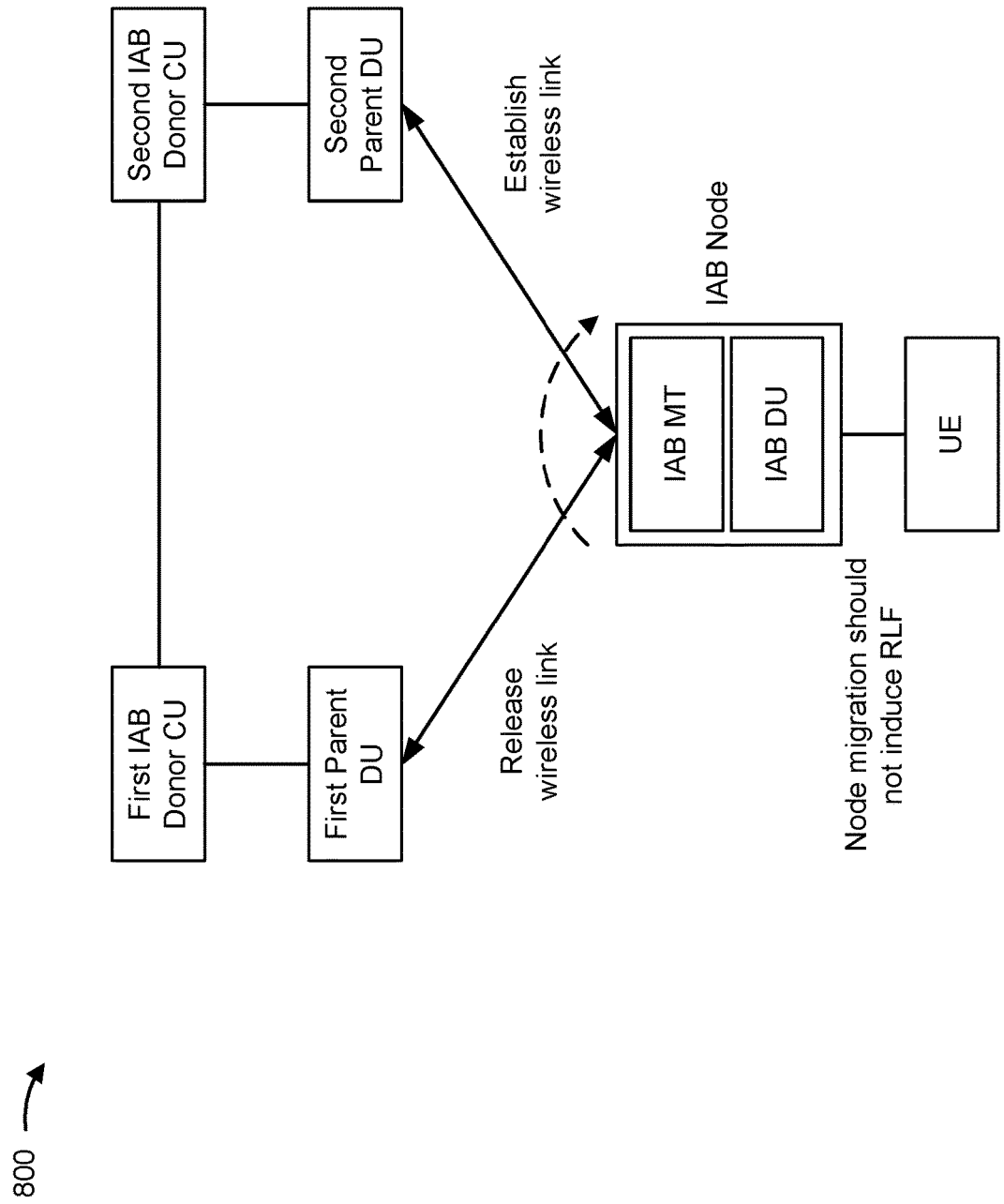
FIGS. 8-9 are diagrams illustrating examples associated with migration of an integrated access and backhaul node, in accordance with the present disclosure.

FIG. 8 is a diagram illustrating an example 800 associated with migration of an IAB node, in accordance with the present disclosure. As shown in FIG. 8, example 800 includes communication between the IAB node (e.g., IAB node 345), one or more IAB donors (e.g., IAB donor 335), and a UE (e.g., UE 120b). In some aspects, the IAB node, the one or more IAB donors, and the UE may be included in a wireless network such as wireless network 100. The IAB node, the one or more IAB donors, and the UE may communicate on a wireless sidelink.

As shown in FIG. 8, the IAB node may include an IAB MT and an IAB DU. The IAB node may be connected to a first parent DU associated with a first IAB donor CU. In some cases, the IAB may be migrated from the first parent DU to a second parent DU, where the second parent DU may be associated with a second IAB donor CU. The first IAB donor CU may be connected to the second IAB donor CU via an Xn interface. When migrating from the first parent DU to the second parent DU, the IAB node may release a wireless link with the first parent DU and establish a wireless link with the second parent DU.

As indicated above, FIG. 8 is provided as an example. Other examples may differ from what is described with regard to FIG. 8.

During a migration of an IAB node, an IAB MT of the IAB node may perform various communications with a second parent DU. For example, the IAB MT may establish a link with the second parent DU. The IAB MT may sync and perform a random access procedure (RACH) with the second parent DU, and/or the IAB MT may send an RRC reconfiguration complete message to the second parent DU. During the migration, the IAB MT may communicate with the second parent DU for establishing or migrating a backhaul onto a path of the second parent DU. Further, during the migration, the node may also perform various communications with a child node (e.g., a child UE or a child IAB node) via a child link between the IAB node and the child node. During the migration, the IAB node may transmit reference signals, transmit scheduling information, and/or transmit migration signaling to the child node.

In some cases, the IAB node may be unable to multiplex communications with the second parent DU and communications with the child node during the migration. In other words, the IAB node may be unable to perform communications with the second parent DU and communications with the child node at a same time. When the IAB node attempts to perform communications with the second parent DU and communications with the child node at a same time when the IAB node does not support multiplexing, communications with the second parent DU and/or communications with the child node may be dropped.

In various aspects of techniques and apparatuses described herein, the first IAB donor CU may communicate with the second IAB donor CU to enable the migration of the IAB node. For example, the first IAB donor CU may receive an acknowledgement from the second IAB donor CU indicating that the IAB node satisfies a multiplexing constraint with respect to communications with the second parent DU and communications with the child node at a same time. The first IAB donor CU may complete the migration of the IAB node based at least in part on the acknowledgement received from the second IAB donor CU.

Figure 9:
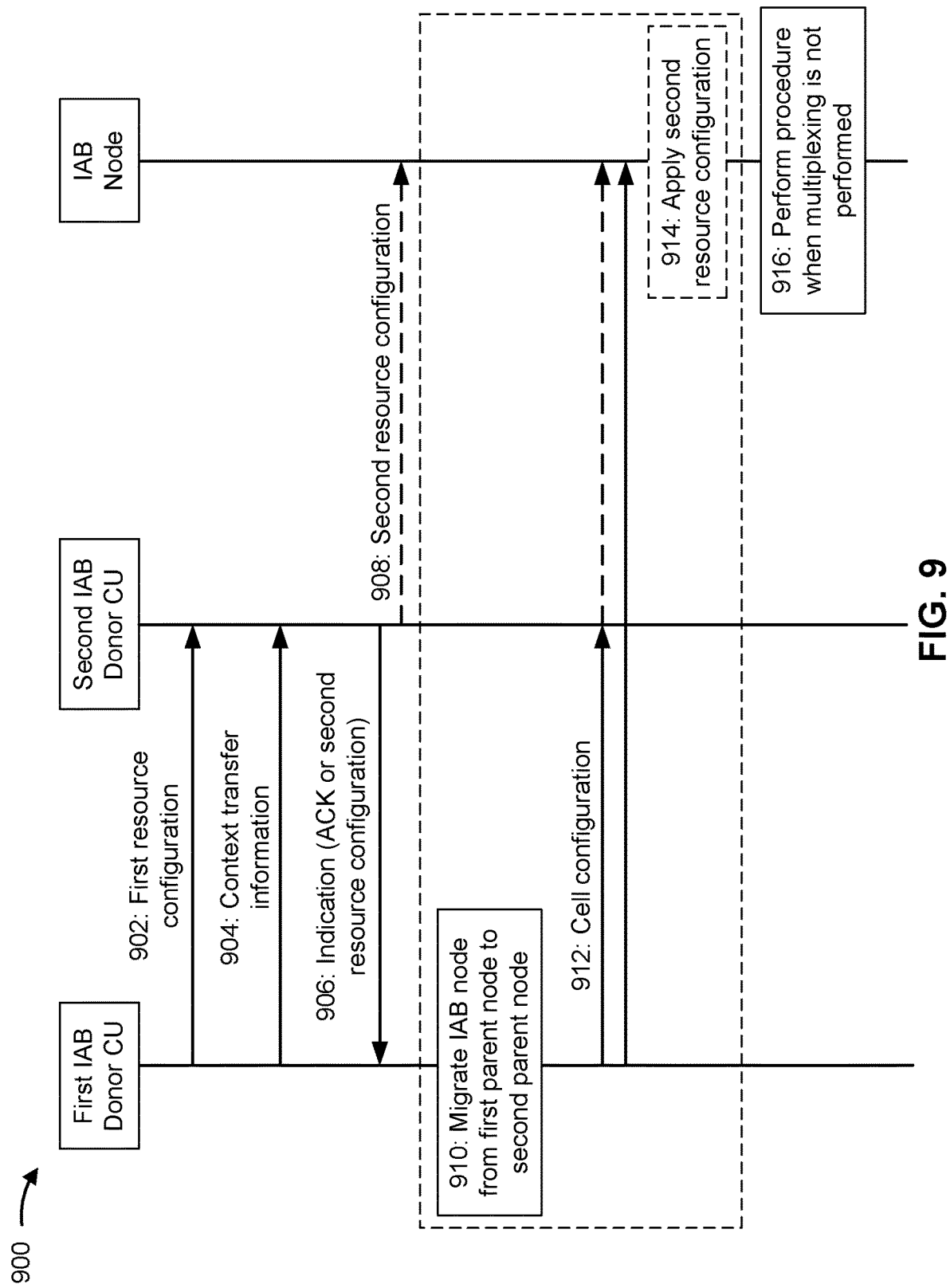

FIG. 9 is a diagram illustrating an example 900 associated with migration of an IAB node, in accordance with the present disclosure. As shown in FIG. 9, example 900 includes communication between the IAB node (e.g., IAB node 345) and IAB donors (e.g., IAB donor 335). The IAB donors may include a first IAB donor CU and a second IAB donor CU. In some aspects, the IAB node and the IAB donors may be included in a wireless network such as wireless network 100. The IAB node and the IAB donors may communicate on a wireless sidelink.

As shown by reference number 902, the first IAB donor CU may transmit a first resource configuration to the second IAB donor CU. The first resource configuration may be associated with a first cell served by the IAB node (e.g., by a DU of the IAB node). The first IAB donor CU may be connected to the IAB node via an F1-C connection or an RRC connection. The first resource configuration may be transmitted to initiate a migration of the IAB node from a first parent node to a second parent node. The second parent node may serve a second cell associated with the second IAB donor CU. In other words, the second parent node may serve the second cell to be connected to by the IAB node after the migration.

In some aspects, the first parent node may be a first IAB donor DU or a first IAB node associated with the first IAB donor CU. In some aspects, the second parent node may be a second IAB donor DU associated with the second IAB donor CU, or the second parent node may be a second IAB node associated with the second IAB donor CU.

In some aspects, the migration of the IAB node from the first parent node to the second parent node may be based at least in part on a handover for the IAB node, a secondary node change for the IAB node, or a secondary node addition for an MT of the IAB node.

In some aspects, initiation of the migration may refer to: coordination between IAB donor CUs regarding a resource configuration, context transfer (e.g., handover, secondary node addition, secondary node change, and so on) of the IAB node between the IAB donor CUs, and then an execution of the migration. In some aspects, the initiation of the migration may refer to: coordination between IAB donor CUs regarding the resource configuration, which may occur as part of the context transfer of the IAB node between the IAB donor CUs, and then the execution of the migration. In some aspects, the execution of the migration (specifically of an IAB-MT of the IAB node) may initially occur, and then coordination of the resource configuration (which may relate to the IAB-DU of the IAB node) may occur between the IAB donor CUs. In some aspects, the initiation of the migration may be interpreted as coordination of the resource configuration before, during, or after the migration.

In some aspects, the first resource configuration of the first cell may include a gNB-DU cell resource configuration of the first cell including at least one of a downlink, uplink and flexible (DUF) slot configuration, or a hard, soft or not available (HSNA) slot configuration of the first cell. The first resource configuration of the first cell may include a configuration of SSB transmissions including cell-defining SSBs or an SSB transmission configuration (STC). The first resource configuration of the first cell may include a CSI-RS configuration of the first cell. The first resource configuration of the first cell may include a RACH configuration of the first cell. The first resource configuration of the first cell may include a scheduling request (SR) configuration of the first cell. The first resource configuration of the first cell may include a PDCCH configuration for the first cell. The first resource configuration of the first cell may include a subcarrier spacing for transmissions of the first cell. The first resource configuration of the first cell may include a multiplexing capability of the IAB node associated with first cell communication. The first resource configuration of the first cell may include at least part of a system information block type 1 (SIB1) message associated with the first cell.

In some aspects, the first resource configuration of the first cell may be specific to a child node served by the first cell. The child may be a UE served by the first cell, or an IAB node MT served by the first cell. In some aspects, the first resource configuration of the first cell may be associated with a spatial region, such as a certain beam direction or a certain SSB area.

In some aspects, the second IAB donor CU may forward at least a portion of the first resource configuration of the first cell to the second parent node that serves the second cell being migrated to by the IAB node. The second IAB donor CU may forward at least a portion of the first resource configuration of the first cell to the second IAB donor DU associated with the second IAB donor CU. The second IAB donor CU may forward at least a portion of the first resource configuration of the first cell to the second IAB node associated with the second IAB donor CU.

As shown by reference number 904, the first IAB donor CU may transmit, to the second IAB donor CU, context transfer information of the MT of the IAB node. The context transfer information of the MT of the IAB node may allow the IAB node to be migrated from the first parent node to the second parent node.

In some aspects, the first resource configuration of the first cell and the context transfer information may be transmitted from the first IAB donor CU to the second IAB donor CU in a single message. In some aspects, the first resource configuration of the first cell and the context transfer information may be transmitted from the first IAB donor CU to the second IAB donor CU in separate messages (e.g., separate Xn/X2 messages). One or more of the separate messages may include an indication of an association between the first resource configuration and the context transfer information.

As shown by reference number 906, the second IAB donor CU may transmit an indication to the first IAB donor CU. The indication may notify the first IAB donor CU that communications associated with the first cell that are performed by the IAB node will not conflict with communications performed by the IAB node with the second parent node serving the second cell. In other words, the indication may notify the first IAB donor CU that the IAB node satisfies a multiplexing constraint between communications of the first cell served by the IAB node and communications of the second cell served by the second parent node.

In some aspects, the communications associated with the first cell may include a CD-SSB transmission, a CSI-RS transmission, a grant transmission, and/or an SR receipt, where such communications may be performed by the IAB node. The communications performed by the IAB node with the second parent node may involve a RACH procedure performed by the IAB node with the second parent node. The RACH procedure may include transmitting a preamble/Msg3/MsgA from the IAB node to the second parent node, and receiving a Msg2/Msg4/MsgB at the IAB node from the second parent node within a random access response (RAR) window according to a RACH configuration associated with the second cell.

In some aspects, the second IAB donor CU may generate the indication based at least in part on the first resource configuration of the first cell. In other words, the second IAB donor CU may determine that communications performed by the IAB node associated with the first cell will not conflict with communications with the second parent node serving the second cell based at least in part on the first resource configuration of the first cell.

In some aspects, the indication received from the second IAB donor CU may be an acknowledgement received from the second parent node. The second IAB donor CU may transmit the acknowledgement to the first IAB donor CU based at least in part on an acknowledgement received at the second IAB donor CU from the second parent node. The second parent node may transmit the acknowledgement to the second IAB donor CU based at least in part on a determination that communications performed by the IAB node associated with the first cell will not conflict with communications with the second parent node serving the second cell. The second IAB donor CU may have previously transmitted at least a portion of the first resource configuration to the second parent node, which may enable the second parent node to determine whether communications performed by the IAB node associated with the first cell will not conflict with communications with the second parent node serving the second cell.

In some aspects, the indication received from the second IAB donor CU may be a second resource configuration. The second resource configuration may correspond to the first cell, and the second IAB donor CU may transmit the second resource configuration to the first IAB donor Cu to enable the migration of the IAB node. The second resource configuration of the first cell may be a modification to the first resource configuration of the first cell to accommodate or enable the migration of the IAB node. The second IAB donor CU may send the second resource configuration after the first IAB donor CU indicates to the second IAB donor CU that a corresponding DU of the IAB node serves the first cell. The second resource configuration may notify the first IAB donor CU that communications associated with the first cell that are performed by the IAB node will not conflict with communications performed by the IAB node with the second parent node serving the second cell. In other words, the second resource configuration may notify the first IAB donor CU that the IAB node satisfies a multiplexing constraint between communications of the first cell served by the IAB node and communications of the second cell served by the second parent node.

In some aspects, the second IAB donor CU may receive at least a portion of the second resource configuration of the first cell from the second parent node that serves the second cell. In some aspects, the second resource configuration of the first cell may be specific to a child node served by the first cell. The child may be a UE served by the first cell, or an IAB node MT served by the first cell. In some aspects, the second resource configuration of the first cell may be associated with a spatial region, such as a certain beam direction or a certain SSB area.

In some aspects, the second IAB donor CU may transmit the second resource configuration to the first IAB donor CU along with a context transfer information response. The second resource configuration and the context transfer information response may be transmitted in a single message or in separate messages (e.g., a same Xn/X2 message or separate Xn/X2 messages). In some aspects, the second IAB donor CU may include the second resource configuration in a handover command, a secondary node change command, or a secondary node addition command for the IAB node.

In some aspects, the indication received from the second IAB donor CU may include a rejection of a migration request to migrate the IAB node from the first parent node to the second parent node. The rejection may indicate a cause of the rejection, and the cause may be in reference to the first reference configuration of the first cell.

As shown by reference number 908, the second IAB donor CU may transmit the second resource configuration of the first cell to the IAB node. The IAB node may establish an F1C connection with the second IAB donor CU before migrating to the second IAB donor CU. The second IAB donor CU may transmit the second resource configuration of the first cell to the IAB node via the F1-C connection. The second resource configuration may enable the IAB node to migrate from the first parent node to the second parent node.

As shown by reference number 910, the first IAB donor CU may migrate the IAB node from the first parent node to the second parent node based at least in part on the indication received from the second IAB donor CU. In other words, based at least in part on the indication that communications associated with the first cell that are performed by the IAB node will not conflict with communications performed by the IAB node with the second parent node serving the second cell, the first IAB donor CU may migrate the IAB node from the first parent node to the second parent node.

In some aspects, as shown by reference number 912, the migration of the IAB node may involve the first IAB donor CU transmitting a cell configuration of the second cell to the second IAB donor CU. The cell configuration of the second cell may accommodate or enable the migration of the IAB node. For example, the cell configuration may be specific to communication with the IAB node. In some aspects, the second IAB donor CU may modify the cell configuration of the second cell based at least in part on the first resource configuration of the first cell. In some aspects, the first IAB donor CU may directly transmit the cell configuration of the second cell to the second parent node via an F1-C connection between the first IAB donor CU and the second parent node.

As shown by reference number 914, the IAB node may apply the second resource configuration. In some aspects, the IAB node may apply the second resource configuration after executing the migration to the second parent node. In some aspects, the IAB node may apply the second resource configuration before executing the migration to the second parent node.

As shown by reference number 916, the IAB node may perform a procedure when multiplexing of communications associated with the first cell that are performed by the IAB node and communications performed by the IAB node with the second parent node serving the second cell is not satisfied. For example, in this case, the IAB node may perform a reconfiguration failure procedure, and/or the IAB node may initiate a connection reestablishment procedure. The IAB node may indicate a cause of the migration failure to the network when initiating the reconfiguration failure procedure and/or the connection reestablishment procedure.

As indicated above, FIG. 9 is provided as an example. Other examples may differ from what is described with regard to FIG. 9.

Figure 10:
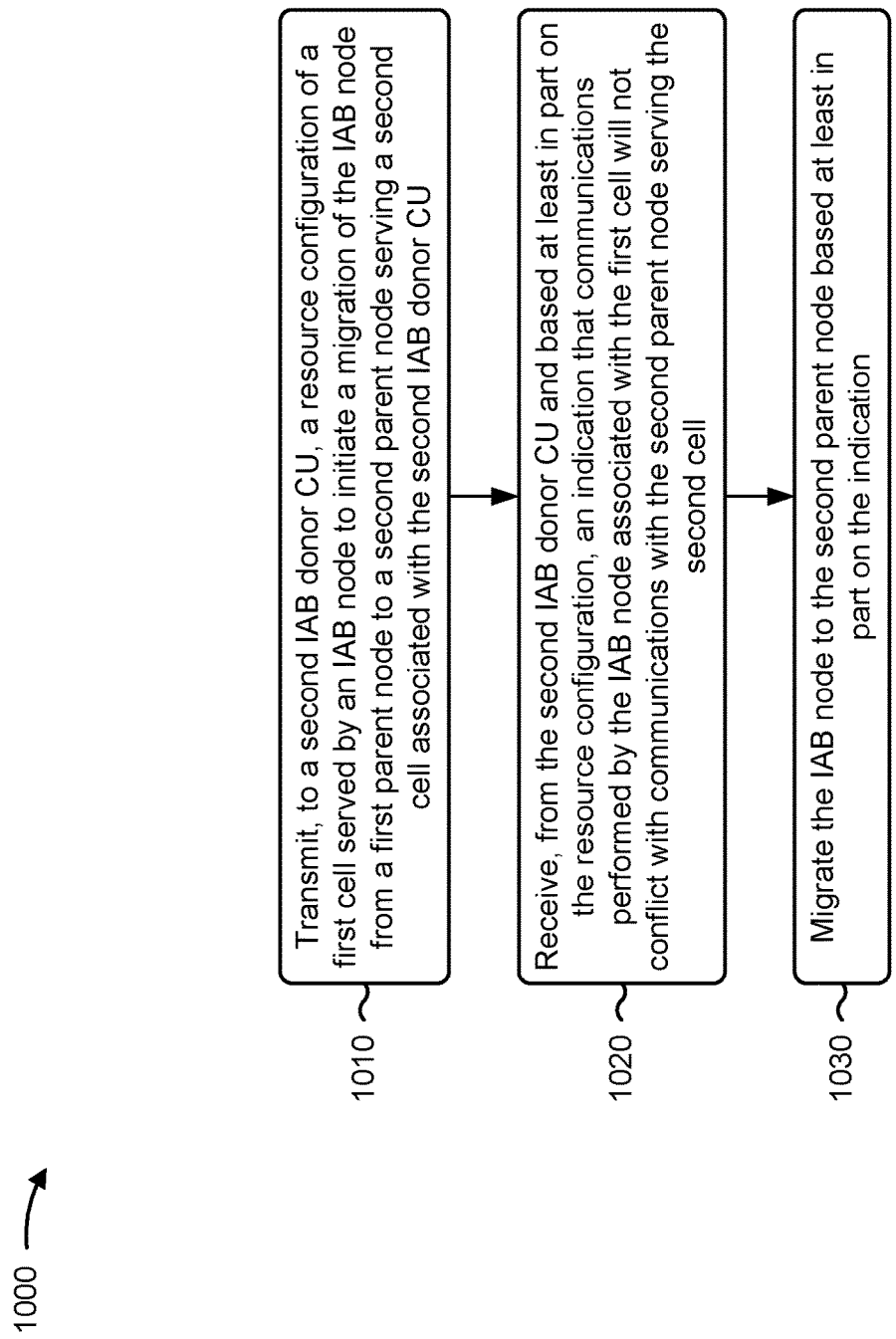
FIGS. 10-11 are diagrams illustrating example processes associated with migration of an integrated access and backhaul node, in accordance with the present disclosure.

FIG. 10 is a diagram illustrating an example process 1000 performed, for example, by a first IAB donor CU, in accordance with the present disclosure. Example process 1000 is an example where the first IAB donor CU performs operations associated with migration of an integrated access and backhaul node.

As shown in FIG. 10, in some aspects, process 1000 may include transmitting, to a second IAB donor CU, a resource configuration of a first cell served by an IAB node to initiate a migration of the IAB node from a first parent node to a second parent node serving a second cell associated with the second IAB donor CU (block 1010). For example, the first IAB donor CU (e.g., using transmit processor 220, TX MIMO processor 230, modulator 232, antenna 234, controller/processor 240, memory 242, and/or scheduler 246; and/or using antenna 252, transmit processor 264, TX MIMO processor 266, modulator 254, controller/processor 280, and/or memory 282) may transmit, to a second IAB donor CU, a resource configuration of a first cell served by an IAB node to initiate a migration of the IAB node from a first parent node to a second parent node serving a second cell associated with the second IAB donor CU, as described above.

As further shown in FIG. 10, in some aspects, process 1000 may include receiving, from the second IAB donor CU and based at least in part on the resource configuration, an indication that communications performed by the IAB node associated with the first cell will not conflict with communications with the second parent node serving the second cell (block 1020). For example, the first IAB donor CU (e.g., using antenna 234, demodulator 232, MIMO detector 236, receive processor 238, controller/processor 240, and/or memory 242; and/or using antenna 252, demodulator 254, MIMO detector 256, receive processor 258, controller/processor 280, and/or memory 282) may receive, from the second IAB donor CU and based at least in part on the resource configuration, an indication that communications performed by the IAB node associated with the first cell will not conflict with communications with the second parent node serving the second cell, as described above.

As further shown in FIG. 10, in some aspects, process 1000 may include migrating the IAB node to the second parent node based at least in part on the indication (block 1030). For example, the first IAB donor CU (e.g., using transmit processor 220, TX MIMO processor 230, modulator 232, antenna 234, demodulator 232, MIMO detector 236, receive processor 238, controller/processor 240, memory 242, and/or scheduler 246; and/or using antenna 252, demodulator 254, MIMO detector 256, receive processor 258, transmit processor 264, TX MIMO processor 266, modulator 254, controller/processor 280, and/or memory 282) may migrate the IAB node to the second parent node based at least in part on the indication, as described above.

Process 1000 may include additional aspects, such as any single aspect or any combination of aspects described below and/or in connection with one or more other processes described elsewhere herein.

In a first aspect, the indication is an acknowledgement received from the second IAB donor CU.

In a second aspect, alone or in combination with the first aspect, the first parent node is a first IAB donor DU associated with the first IAB donor CU.

In a third aspect, alone or in combination with one or more of the first and second aspects, the second parent node is a second IAB donor DU associated with the second IAB donor CU.

In a fourth aspect, alone or in combination with one or more of the first through third aspects, the second parent node is a second IAB node associated with the second IAB donor CU.

In a fifth aspect, alone or in combination with one or more of the first through fourth aspects, the migration of the IAB node to the second parent node is based at least in part on a handover for the IAB node, a secondary node change for the IAB node, or a secondary node addition for the IAB node.

In a sixth aspect, alone or in combination with one or more of the first through fifth aspects, process 1000 includes transmitting, to the second IAB donor CU, context transfer information of an MT of the IAB node.

In a seventh aspect, alone or in combination with one or more of the first through sixth aspects, the resource configuration of the first cell and the context transfer information are transmitted from the first IAB donor CU to the second IAB donor CU in a single message.

In an eighth aspect, alone or in combination with one or more of the first through seventh aspects, the resource configuration of the first cell and the context transfer information are transmitted from the first IAB donor CU to the second IAB donor CU in separate messages, wherein one or more of the separate messages include an indication of an association between the resource configuration and the context transfer information.

In a ninth aspect, alone or in combination with one or more of the first through eighth aspects, the indication received from the second IAB donor CU is based at least in part on an acknowledgement received at the second IAB donor CU from the second parent node, wherein the second parent node serves the second cell to be connected to by the IAB node after the migration.

In a tenth aspect, alone or in combination with one or more of the first through ninth aspects, process 1000 includes transmitting, to the second IAB donor CU or the second parent node, a cell configuration of the second cell to enable the migration of the IAB node to the second parent node serving the second cell, wherein the cell configuration of the second cell is specific to a communication with the IAB node.

In an eleventh aspect, alone or in combination with one or more of the first through tenth aspects, the resource configuration is a first resource configuration, and the indication is a second resource configuration received from the second IAB donor CU to accommodate the migration of the IAB node.

In a twelfth aspect, alone or in combination with one or more of the first through eleventh aspects, the second resource configuration is received with a context transfer information response, wherein the second resource configuration and the context transfer information response are received in a single message or in separate messages.

In a thirteenth aspect, alone or in combination with one or more of the first through twelfth aspects, the second resource configuration is included in one of a handover command, a secondary node change command, or a secondary node addition command for the IAB node.

In a fourteenth aspect, alone or in combination with one or more of the first through thirteenth aspects, the resource configuration of the first cell includes one or more of a gNB-DU cell resource configuration of the first cell including at least one of a DUF slot configuration or an HSNA slot configuration of the first cell, a configuration of SSB transmissions including cell-defining SSBs or an SSB transmission configuration, a channel state information reference signal configuration of the first cell, a random access channel configuration of the first cell, a scheduling request configuration of the first cell, a downlink control channel configuration for the first cell, a subcarrier spacing for transmissions of the first cell, a multiplexing capability of the IAB node associated with first cell communication, or at least part of a system information block message associated with the first cell.

In a fifteenth aspect, alone or in combination with one or more of the first through fourteenth aspects, the resource configuration of the first cell is specific to a child served by the first cell, wherein the child is a UE served by the first cell or an IAB node MT served by the first cell.

In a sixteenth aspect, alone or in combination with one or more of the first through fifteenth aspects, the resource configuration of the first cell is associated with a spatial region.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
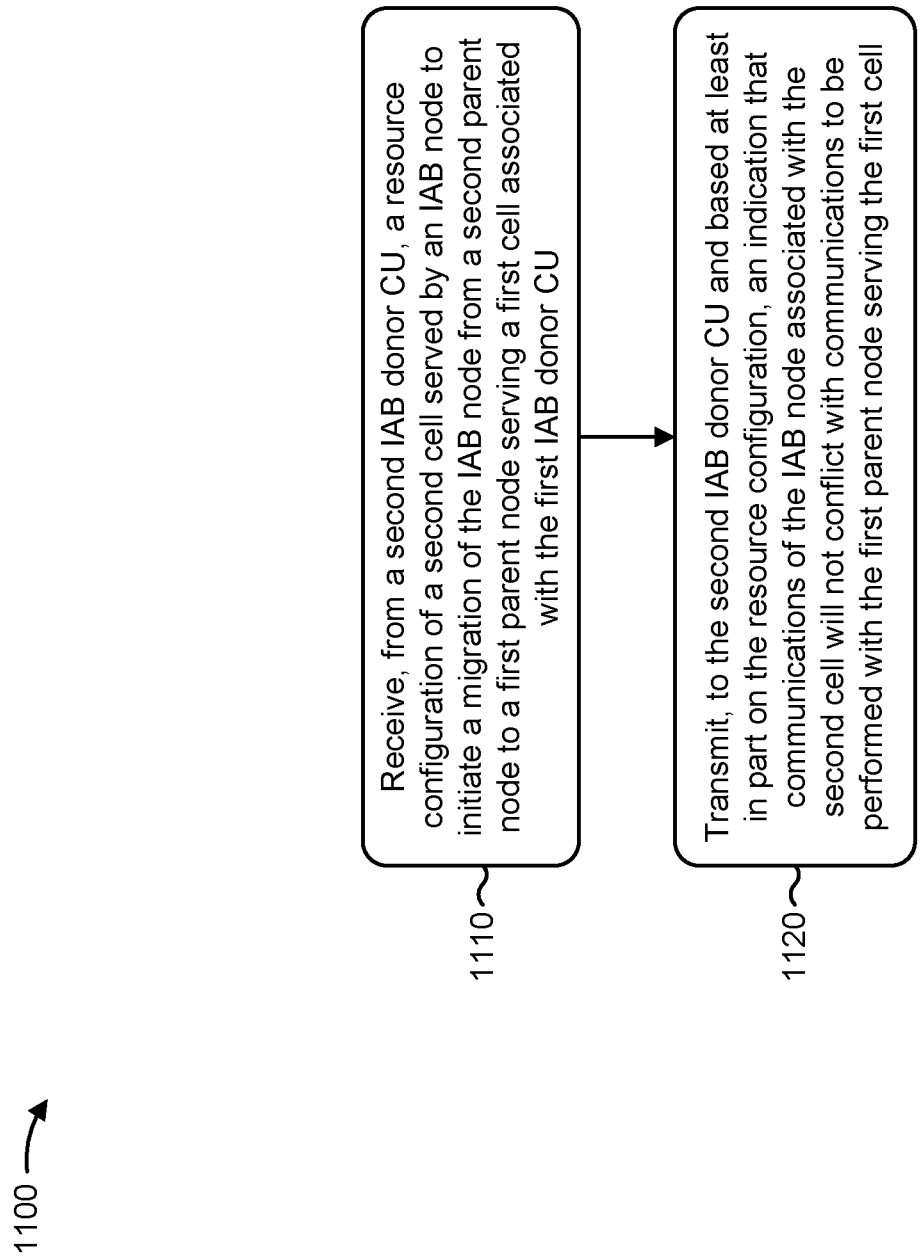

FIG. 11 is a diagram illustrating an example process 1100 performed, for example, by a first IAB donor CU, in accordance with the present disclosure. Example process 1100 is an example where the first IAB donor CU performs operations associated with migration of an integrated access and backhaul node.

The "first" and "second" IAB donors are reversed with respect to process 1000 and process 1100. For example, the first IAB donor CU in process 1100 may correspond to the second IAB donor CU in process 1000, the second IAB donor CU in process 1100 may correspond to the first IAB donor CU in process 1000, and so on.

As shown in FIG. 11, in some aspects, process 1100 may include receiving, from a second IAB donor CU, a resource configuration of a second cell served by an IAB node to initiate a migration of the IAB node from a second parent node to a first parent node serving a first cell associated with the first IAB donor CU (block 1110). For example, the first IAB donor CU (e.g., using antenna 234, demodulator 232, MIMO detector 236, receive processor 238, controller/processor 240, and/or memory 242; and/or using antenna 252, demodulator 254, MIMO detector 256, receive processor 258, controller/processor 280, and/or memory 282) may receive, from a second IAB donor CU, a resource configuration of a second cell served by an IAB node to initiate a migration of the IAB node from a second parent node to a first parent node serving a first cell associated with the first IAB donor CU, as described above.

As further shown in FIG. 11, in some aspects, process 1100 may include transmitting, to the second IAB donor CU and based at least in part on the resource configuration, an indication that communications of the IAB node associated with the second cell will not conflict with communications to be performed with the first parent node serving the first cell (block 1120). For example, the first IAB donor CU (e.g., using transmit processor 220, TX MIMO processor 230, modulator 232, antenna 234, controller/processor 240, memory 242, and/or scheduler 246; and/or using antenna 252, transmit processor 264, TX MIMO processor 266, modulator 254, controller/processor 280, and/or memory 282) may transmit, to the second IAB donor CU and based at least in part on the resource configuration, an indication that communications of the IAB node associated with the second cell will not conflict with communications to be performed with the first parent node serving the first cell, as described above.

Process 1100 may include additional aspects, such as any single aspect or any combination of aspects described below and/or in connection with one or more other processes described elsewhere herein.

In a first aspect, the indication is an acknowledgement transmitted to the second IAB donor CU.

In a second aspect, alone or in combination with the first aspect, the second parent node is a second IAB donor DU associated with the second IAB donor CU.

In a third aspect, alone or in combination with one or more of the first and second aspects, the first parent node is a first IAB donor DU associated with the first IAB donor CU.

In a fourth aspect, alone or in combination with one or more of the first through third aspects, the first parent node is a first IAB node associated with the first IAB donor CU.

In a fifth aspect, alone or in combination with one or more of the first through fourth aspects, the migration of the IAB node to the first parent node is based at least in part on a handover for the IAB node, a secondary node change for the IAB node, or a secondary node addition for the IAB node.

In a sixth aspect, alone or in combination with one or more of the first through fifth aspects, process 1100 includes receiving, from the second IAB donor CU, context transfer information of an MT of the IAB node.

In a seventh aspect, alone or in combination with one or more of the first through sixth aspects, the resource configuration of the second cell and the context transfer information are received from the second IAB donor CU in a single message.

In an eighth aspect, alone or in combination with one or more of the first through seventh aspects, the resource configuration of the second cell and the context transfer information are received from the second IAB donor CU in separate messages, wherein one or more of the separate messages include an indication of an association between the resource configuration and the context transfer information.

In a ninth aspect, alone or in combination with one or more of the first through eighth aspects, process 1100 includes transmitting, to a DU of the first parent node, at least a portion of the resource configuration received from the second IAB donor CU, and receiving, from the first parent node, an acknowledgement indicating that the communications of the IAB node associated with the second cell will not conflict with the communications to be performed with the first parent node serving the first cell, wherein the indication transmitted to the second IAB donor CU is based at least in part on the acknowledgement received from the first parent node.

In a tenth aspect, alone or in combination with one or more of the first through ninth aspects, process 1100 includes modifying, based at least in part on the resource configuration received from the second IAB donor CU, a cell configuration of the first cell to enable the migration of the IAB node to the first parent node serving the first cell.

In an eleventh aspect, alone or in combination with one or more of the first through tenth aspects, the resource configuration is a second resource configuration, and wherein the indication is a first resource configuration transmitted from the first IAB donor CU to the second IAB donor CU to accommodate the migration of the IAB node.

In a twelfth aspect, alone or in combination with one or more of the first through eleventh aspects, process 1100 includes receiving at least a portion of the first resource configuration from the first parent node serving the first cell.

In a thirteenth aspect, alone or in combination with one or more of the first through twelfth aspects, the first resource configuration is transmitted to the second IAB donor CU with a context transfer information response, wherein the first resource configuration and the context transfer information response are transmitted in a single message or in separate messages.

In a fourteenth aspect, alone or in combination with one or more of the first through thirteenth aspects, the first resource configuration is included in one of a handover command, a secondary node change command, or a secondary node addition command for the IAB node.

In a fifteenth aspect, alone or in combination with one or more of the first through fourteenth aspects, process 1100 includes transmitting, to the IAB node, a cell configuration of the first cell to enable the migration of the IAB node to the first parent node serving the first cell.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
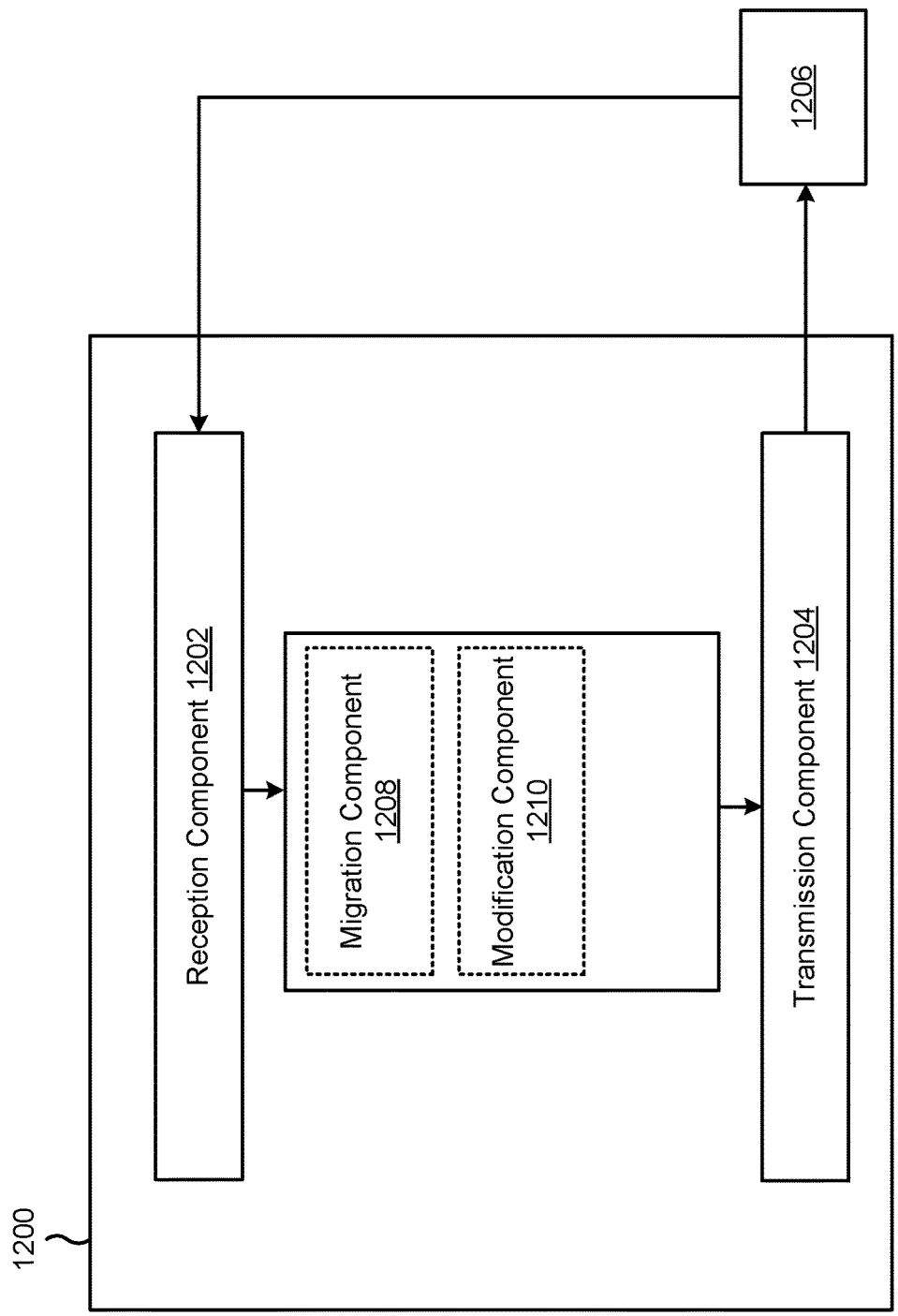
FIG. 12 is a block diagram of an example apparatus for wireless communication, in accordance with the present disclosure.

FIG. 12 is a block diagram of an example apparatus 1200 for wireless communication. The apparatus 1200 may be a first IAB donor CU, or a first IAB donor CU may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a migration component 1208, and/or a modification component 1210, among other examples.

In some aspects, the apparatus 1200 may be configured to perform one or more operations described herein in connection with FIGS. 8-9. Additionally, or alternatively, the apparatus 1200 may be configured to perform one or more processes described herein, such as process 1000 of FIG. 10, process 1100 of FIG. 11, or a combination thereof. In some aspects, the apparatus 1200 and/or one or more components shown in FIG. 12 may include one or more components of the first IAB donor CU described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the first IAB donor CU described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the first IAB donor CU described above in connection with FIG. 2. In some aspects, the transmission component 1204 may be collocated with the reception component 1202 in a transceiver.

The transmission component 1204 may transmit, to a second IAB donor CU, a resource configuration of a first cell served by an IAB node to initiate a migration of the IAB node from a first parent node to a second parent node serving a second cell associated with the second IAB donor CU. The reception component 1202 may receive, from the second IAB donor CU and based at least in part on the resource configuration, an indication that communications performed by the IAB node associated with the first cell will not conflict with communications with the second parent node serving the second cell. The migration component 1208 may migrate the IAB node to the second parent node based at least in part on the indication.

In some aspects, the migration component 1208 may include one or more antennas, a demodulator, a MIMO detector, a receive processor, a modulator, a transmit MIMO processor, a transmit processor, a controller/processor, a memory, or a combination thereof, of the first IAB donor CU described above in connection with FIG. 2.

In some aspects, the transmission component 1204 may transmit, to the second IAB donor CU, context transfer information of an MT of the IAB node.

In some aspects, the reception component 1202 may receive, from a second IAB donor CU, a resource configuration of a second cell served by an IAB node to initiate a migration of the IAB node from a second parent node to a first parent node serving a first cell associated with the first IAB donor CU. The transmission component 1204 may transmit, to the second IAB donor CU and based at least in part on the resource configuration, an indication that communications of the IAB node associated with the second cell will not conflict with communications to be performed with the first parent node serving the first cell.

In some aspects, the transmission component 1204 may transmit, to the second IAB donor CU or the second parent node, a cell configuration of the second cell to enable the migration of the IAB node to the second parent node serving the second cell, wherein the cell configuration of the second cell is specific to a communication with the IAB node.

In some aspects, the reception component 1202 may receive, from the second IAB donor CU, context transfer information of an MT of the IAB node.

In some aspects, the transmission component 1204 may transmit, to a DU of the first parent node, at least a portion of the resource configuration received from the second IAB donor CU. The reception component 1202 may receive, from the first parent node, an acknowledgement indicating that the communications of the IAB node associated with the second cell will not conflict with the communications to be performed with the first parent node serving the first cell, wherein the indication transmitted to the second IAB donor CU is based at least in part on the acknowledgement received from the first parent node.

In some aspects, the modification component 1210 may modify, based at least in part on the resource configuration received from the second IAB donor CU, a cell configuration of the first cell to enable the migration of the IAB node to the first parent node serving the first cell. The modification component 1210 may include one or more antennas, a demodulator, a MIMO detector, a receive processor, a modulator, a transmit MIMO processor, a transmit processor, a controller/processor, a memory, or a combination thereof, of the first IAB donor CU described above in connection with FIG. 2.

In some aspects, the reception component 1202 may receive at least a portion of the first resource configuration from the first parent node serving the first cell.

In some aspects, the transmission component 1204 may transmit, to the IAB node, a cell configuration of the first cell to enable the migration of the IAB node to the first parent node serving the first cell.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a first integrated access and backhaul (IAB) donor central unit (CU), comprising: transmitting, to a second IAB donor CU, a resource configuration of a first cell served by an IAB node to initiate a migration of the IAB node from a first parent node to a second parent node serving a second cell associated with the second IAB donor CU; receiving, from the second IAB donor CU, an indication based at least in part on the resource configuration; and migrating the IAB node to the second parent node based at least in part on the indication.

Aspect 2: The method of Aspect 1, wherein the indication indicates that communications performed by the IAB node associated with the first cell will not conflict with communications with the second parent node serving the second cell.

Aspect 3: The method of any of Aspects 1 through 2, wherein the indication received from the second IAB donor CU is based at least in part on an acknowledgement received at the second IAB donor CU from the second parent node, and wherein the second parent node serves the second cell to be connected to by the IAB node after the migration.

Aspect 4: The method of Aspect 3, further comprising: transmitting, to the second IAB donor CU or the second parent node, a cell configuration of the second cell to enable the migration of the IAB node to the second parent node serving the second cell, wherein the cell configuration of the second cell is specific to a communication with the IAB node.

Aspect 5: The method of any of Aspects 1 through 4, wherein the resource configuration is a first resource configuration, and wherein the indication is a second resource configuration received from the second IAB donor CU to accommodate the migration of the IAB node.

Aspect 6: The method of Aspect 5, wherein the second resource configuration is received with a context transfer information response, wherein the second resource configuration and the context transfer information response are received in a single message or in separate messages.

Aspect 7: The method of Aspect 5, wherein the second resource configuration is included in one of: a handover command, a secondary node change command, or a secondary node addition command for the IAB node.

Aspect 8: The method of any of Aspects 1 through 7, wherein the resource configuration of the first cell includes one or more of: a gNB-DU cell resource configuration of the first cell including at least one of a downlink, uplink and flexible (DUF) slot configuration or a hard, soft or not available (HSNA) slot configuration of the first cell; a configuration of synchronization signal block (SSB) transmissions including cell-defining SSBs or an SSB transmission configuration; a channel state information reference signal configuration of the first cell; a random access channel configuration of the first cell; a scheduling request configuration of the first cell; a downlink control channel configuration for the first cell; a subcarrier spacing for transmissions of the first cell; a multiplexing capability of the IAB node associated with first cell communication; or at least part of a system information block message associated with the first cell.

Aspect 9: The method of any of Aspects 1 through 8, wherein the indication is an acknowledgement received from the second IAB donor CU.

Aspect 10: The method of any of Aspects 1 through 9, wherein: the first parent node is a first IAB donor distributed unit (DU) associated with the first IAB donor CU; and the second parent node is a second IAB donor DU associated with the second IAB donor CU, or the second parent node is a second IAB node associated with the second IAB donor CU.

Aspect 11: The method of any of Aspects 1 through 10, wherein the migration of the IAB node to the second parent node is based at least in part on a handover for the IAB node, a secondary node change for the IAB node, or a secondary node addition for the IAB node.

Aspect 12: The method of any of Aspects 1 through 11, further comprising: transmitting, to the second IAB donor CU, context transfer information of a mobile termination (MT) of the IAB node, wherein: the resource configuration of the first cell and the context transfer information are transmitted from the first IAB donor CU to the second IAB donor CU in a single message; or the resource configuration of the first cell and the context transfer information are transmitted from the first IAB donor CU to the second IAB donor CU in separate messages, wherein one or more of the separate messages include an indication of an association between the resource configuration and the context transfer information.

Aspect 13: The method of any of Aspects 1 through 12, wherein: the resource configuration of the first cell is specific to a child served by the first cell, wherein the child is a UE served by the first cell or an IAB node mobile termination (MT) served by the first cell; or the resource configuration of the first cell is associated with a spatial region.

Aspect 14: The method of any of Aspects 1 through 13, wherein migrating the IAB node to the second parent node comprises migrating a first connection between the IAB node and the first parent node to a second connection between the IAB node and the second parent node, wherein migrating the IAB node further comprises terminating the first connection between the IAB node and the first parent node after establishing the second connection between the IAB node and the second parent node.

Aspect 15: A method of wireless communication performed by a first integrated access and backhaul (IAB) donor central unit (CU), comprising: receiving, from a second IAB donor CU, a resource configuration of a second cell served by an IAB node to initiate a migration of the IAB node from a second parent node to a first parent node serving a first cell associated with the first IAB donor CU; and transmitting, to the second IAB donor CU, an indication based at least in part on the resource configuration that enables the IAB node to be migrated to the first parent node.

Aspect 16: The method of Aspect 15, wherein the indication indicates that communications of the IAB node associated with the second cell will not conflict with communications to be performed with the first parent node serving the first cell.

Aspect 17: The method of any of Aspects 15 through 16, wherein: the second parent node is a second IAB donor distributed unit (DU) associated with the second IAB donor CU; and the first parent node is a first IAB donor distributed unit (DU) associated with the first IAB donor CU, or the first parent node is a first IAB node associated with the first IAB donor CU.

Aspect 18: The method of any of Aspects 15 through 17, wherein the migration of the IAB node to the first parent node is based at least in part on a handover for the IAB node, a secondary node change for the IAB node, or a secondary node addition for the IAB node.

Aspect 19: The method of any of Aspects 15 through 18, further comprising: receiving, from the second IAB donor CU, context transfer information of a mobile termination (MT) of the IAB node, wherein: the resource configuration of the second cell and the context transfer information are received from the second IAB donor CU in a single message; or the resource configuration of the second cell and the context transfer information are received from the second IAB donor CU in separate messages, wherein one or more of the separate messages include an indication of an association between the resource configuration and the context transfer information.

Aspect 20: The method of any of Aspects 15 through 19, further comprising: transmitting, to a distributed unit (DU) of the first parent node, at least a portion of the resource configuration received from the second IAB donor CU; and receiving, from the first parent node, an acknowledgement indicating that the communications of the IAB node associated with the second cell will not conflict with the communications to be performed with the first parent node serving the first cell, wherein the indication transmitted to the second IAB donor CU is based at least in part on the acknowledgement received from the first parent node.

Aspect 21: The method of any of Aspects 15 through 20, further comprising: modifying, based at least in part on the resource configuration received from the second IAB donor CU, a cell configuration of the first cell to enable the migration of the IAB node to the first parent node serving the first cell.

Aspect 22: The method of any of Aspects 15 through 21, wherein the resource configuration is a second resource configuration, and wherein the indication is a first resource configuration transmitted from the first IAB donor CU to the second IAB donor CU to accommodate the migration of the IAB node.

Aspect 23: The method of Aspect 22, wherein: at least a portion of the first resource configuration is received from the first parent node serving the first cell; the first resource configuration is transmitted to the second IAB donor CU with a context transfer information response, wherein the first resource configuration and the context transfer information response are transmitted in a single message or in separate messages; or the first resource configuration is included in one of: a handover command, a secondary node change command, or a secondary node addition command for the IAB node.

Aspect 24: An apparatus for wireless communication at a device, comprising a processor; memory coupled with the processor; and instructions stored in the memory and executable by the processor to cause the apparatus to perform the method of one or more of Aspects 1-14.

Aspect 25: A device for wireless communication, comprising a memory and one or more processors coupled to the memory, the one or more processors configured to perform the method of one or more of Aspects 1-14.

Aspect 26: An apparatus for wireless communication, comprising at least one means for performing the method of one or more of Aspects 1-14.

Aspect 27: A non-transitory computer-readable medium storing code for wireless communication, the code comprising instructions executable by a processor to perform the method of one or more of Aspects 1-14.

Aspect 28: A non-transitory computer-readable medium storing a set of instructions for wireless communication, the set of instructions comprising one or more instructions that, when executed by one or more processors of a device, cause the device to perform the method of one or more of Aspects 1-14.

Aspect 29: An apparatus for wireless communication at a device, comprising a processor; memory coupled with the processor; and instructions stored in the memory and executable by the processor to cause the apparatus to perform the method of one or more of Aspects 15-23.

Aspect 30: A device for wireless communication, comprising a memory and one or more processors coupled to the memory, the one or more processors configured to perform the method of one or more of Aspects 15-23.

Aspect 31: An apparatus for wireless communication, comprising at least one means for performing the method of one or more of Aspects 15-23.

Aspect 32: A non-transitory computer-readable medium storing code for wireless communication, the code comprising instructions executable by a processor to perform the method of one or more of Aspects 15-23.

Aspect 33: A non-transitory computer-readable medium storing a set of instructions for wireless communication, the set of instructions comprising one or more instructions that, when executed by one or more processors of a device, cause the device to perform the method of one or more of Aspects 15-23.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first integrated access and backhaul (IAB) donor central unit (CU), comprising:
   one or more memories storing processor-executable code; and one or more processors coupled with the one or more memories, at least one processor of the one or more processors configured to cause the apparatus to:
- transmit, to a second IAB donor CU, context transfer information of a mobile termination (MT) of an IAB node;
- transmit, to the second IAB donor CU, a resource configuration of a first cell served by the IAB node to initiate a migration of the IAB node from a distributed unit (DU) associated with the first IAB donor CU to a parent node serving a second cell associated with the second IAB donor CU, the resource configuration of the first cell including a DU cell resource configuration of the first cell, the DU cell resource configuration including at least one of a downlink, uplink and flexible (DUF) slot configuration or a hard, soft or not available (HSNA) slot configuration of the first cell, and the resource configuration of the first cell and the context transfer information being transmitted in separate messages, wherein one or more of the separate messages include an indication of an association between the resource configuration and the context transfer information;
- receive, from the second IAB donor CU, an indication in accordance with the resource configuration; and
- migrate the IAB node to the parent node serving the second cell according to the indication received from the second IAB donor CU.

2. The apparatus of claim 1, wherein the indication received from the second IAB donor CU indicates that communications performed by the IAB node associated with the first cell will not conflict with communications with the second parent node serving the second cell.

3. The apparatus of claim 1, wherein the indication received from the second IAB donor CU is responsive to an acknowledgement received at the second IAB donor CU from the parent node serving the second cell, the parent node serving the second cell to be connected to by the IAB node after the migration.

4. The apparatus of claim 3, wherein the at least one processor is further configured to cause the apparatus to:
- transmit, to the second IAB donor CU or the parent node serving the second cell, a cell configuration of the second cell to enable the migration of the IAB node to the parent node serving the second cell, the cell configuration of the second cell being specific to a communication with the IAB node.

5. The apparatus of claim 1, wherein the resource configuration is a first resource configuration, and the indication received from the second IAB donor CU is a second resource configuration received from the second IAB donor CU to accommodate the migration of the IAB node.

6. The apparatus of claim 5, wherein the second resource configuration is received with a context transfer information response in a single message or in separate messages.

7. The apparatus of claim 5, wherein the second resource configuration is included in one of: a handover command, a secondary node change command, or a secondary node addition command for the IAB node.

8. The apparatus of claim 1, wherein the resource configuration of the first cell further includes one or more of:
- a configuration of synchronization signal block (SSB) transmissions including cell-defining SSBs or an SSB transmission configuration,
- a channel state information reference signal configuration of the first cell,
- a random access channel configuration of the first cell,
- a scheduling request configuration of the first cell,
- a downlink control channel configuration for the first cell,
- a subcarrier spacing for transmissions of the first cell,
- a multiplexing capability of the IAB node associated with first cell communication, or
- at least part of a system information block message associated with the first cell.

9. The apparatus of claim 1, wherein the indication received from the second IAB donor CU is an acknowledgement received from the second IAB donor CU.

10. The apparatus of claim 1, wherein the parent node serving the second cell is an IAB donor DU associated with the second IAB donor CU or is an IAB node associated with the second IAB donor CU.

11. The apparatus of claim 1, wherein the migration of the IAB node to the parent node serving the second cell is in accordance with a handover for the IAB node, a secondary node change for the IAB node, or a secondary node addition for the IAB node.

12. The apparatus of claim 1, wherein the resource configuration of the first cell is specific to a child served by the first cell, the child being a UE served by the first cell or an IAB node mobile termination (MT) served by the first cell; or
the resource configuration of the first cell is associated with a spatial region.

13. An apparatus for wireless communication at a first integrated access and backhaul (IAB) donor central unit (CU), comprising:
- one or more memories storing processor-executable code; and
- one or more processors coupled with the one or more memories, at least one processor of the one or more processors configured to cause the apparatus to:
  - receive, from a second IAB donor CU, context transfer information of a mobile termination (MT) of an IAB node;
  - receive, from the second IAB donor CU, a resource configuration of a second cell served by the IAB node to initiate a migration of the IAB node from a distributed unit (DU) associated with the second IAB donor CU to a parent node serving a first cell associated with the first IAB donor CU, the resource configuration of the second cell including a DU cell resource configuration of the second cell, the DU cell resource configuration including at least one of a downlink, uplink and flexible (DUF) slot configuration or a hard, soft or not available (HSNA) slot configuration of the second cell, and the resource configuration of the second cell and the context transfer information being received in separate messages, wherein one or more of the separate messages include an indication of an association between the resource configuration and the context transfer information; and
  - transmit, to the second IAB donor CU, an indication in accordance with the resource configuration that enables the IAB node to be migrated to the parent node serving the first cell.

14. The apparatus of claim 13, wherein the indication transmitted to the second IAB donor CU indicates that communications of the IAB node associated with the second cell will not conflict with communications to be performed with the parent node serving the first cell.

15. The apparatus of claim 13, wherein the parent node serving the first cell is an IAB donor DU associated with the first IAB donor CU or is an IAB node associated with the first IAB donor CU.

16. The apparatus of claim 13, wherein the migration of the IAB node to the parent node serving the first cell is in accordance with a handover for the IAB node, a secondary node change for the IAB node, or a secondary node addition for the IAB node.

17. The apparatus of claim 13, wherein the at least one processor is further configured to cause the apparatus to:
transmit, to a DU of the parent node, at least a portion of the resource configuration received from the second IAB donor CU; and
receive, from the parent node, an acknowledgement indicating that communications of the IAB node associated with the second cell will not conflict with communications to be performed with the parent node serving the first cell, the indication transmitted to the second IAB donor CU responsive to the acknowledgement received from the parent node.

18. The apparatus of claim 13, wherein the at least one processor is further configured to cause the apparatus to:
modify, in accordance with the resource configuration received from the second IAB donor CU, a cell configuration of the first cell to enable the migration of the IAB node to the parent node serving the first cell.

19. The apparatus of claim 13, wherein the resource configuration of the second cell further includes one or more of:
a configuration of synchronization signal block (SSB) transmissions including cell-defining SSBs or an SSB transmission configuration,
a channel state information reference signal configuration of the second cell,
a random access channel configuration of the second cell,
a scheduling request configuration of the second cell,
a downlink control channel configuration for the second cell,
a subcarrier spacing for transmissions of the second cell,
a multiplexing capability of the IAB node associated with cell communication, or
at least part of a system information block message associated with the second cell.

20. The apparatus of claim 13, wherein the resource configuration is a second resource configuration, and the indication transmitted to the second IAB donor CU is a first resource configuration transmitted from the first IAB donor CU to the second IAB donor CU to accommodate the migration of the IAB node.

21. The apparatus of claim 20, wherein: the at least one processor is further configured to cause the apparatus to:
receive at least a portion of the first resource configuration from the parent node serving the first cell,
the first resource configuration being transmitted to the second IAB donor CU with a context transfer information response in a single message or in separate messages, or
the first resource configuration being included in one of:
a handover command, a secondary node change command, or a secondary node addition command for the IAB node.

22. A method of wireless communication performed at a first integrated access and backhaul (IAB) donor central unit (CU), comprising:

transmitting, to a second IAB donor CU, context transfer information of a mobile termination (MT) of an IAB node;
transmitting, to the second IAB donor CU, a resource configuration of a first cell served by the IAB node to initiate a migration of the IAB node from a distributed unit (DU) associated with the first IAB donor CU to a parent node serving a second cell associated with the second IAB donor CU, the resource configuration of the first cell including a DU cell resource configuration of the first cell, the DU cell resource configuration including at least one of a downlink, uplink and flexible (DUF) slot configuration or a hard, soft or not available (HSNA) slot configuration of the first cell, and the resource configuration of the first cell and the context transfer information transmitted in separate messages, wherein one or more of the separate messages include an indication of an association between the resource configuration and the context transfer information;
receiving, from the second IAB donor CU, an indication in accordance with the resource configuration; and
migrating the IAB node to the parent node serving the second cell according to the indication received from the second IAB donor CU.

23. The method of claim 22, wherein the indication received from the second IAB donor CU indicates that communications performed by the IAB node associated with the first cell will not conflict with communications with the parent node serving the second cell.

24. The method of claim 22, wherein the indication received from the second IAB donor CU is responsive to an acknowledgement received at the second IAB donor CU from the parent node serving the second cell, the parent node serving the second cell to be connected to by the IAB node after the migration, and the method further comprising:
transmitting, to the second IAB donor CU or the parent node serving the second cell, a cell configuration of the second cell to enable the migration of the IAB node to the parent node serving the second cell, the cell configuration of the second cell being specific to a communication with the IAB node.

25. The method of claim 22, wherein the resource configuration is a first resource configuration, and the indication received from the second IAB donor CU is a second resource configuration received from the second IAB donor CU to accommodate the migration of the IAB node.

26. A method of wireless communication performed by a first integrated access and backhaul (IAB) donor central unit (CU), comprising:
receiving, from a second IAB donor CU, context transfer information of a mobile termination (MT) of an IAB node;
receiving, from the second IAB donor CU, a resource configuration of a second cell served by the IAB node to initiate a migration of the IAB node from a distributed unit (DU) associated with the second IAB donor CU to a parent node serving a first cell associated with the first IAB donor CU, the resource configuration of the second cell including a DU cell resource configuration of the second cell, the DU cell resource configuration including at least one of a downlink, uplink and flexible (DUF) slot configuration or a hard, soft or not available (HSNA) slot configuration of the second cell, and the resource configuration of the second cell and the context transfer information being received in separate messages, wherein one or more of the separate messages include an indication of an association between the resource configuration and the context transfer information; and transmitting, to the second IAB donor CU, an indication in accordance with the resource configuration that enables the IAB node to be migrated to the parent node serving the first cell.

27. The method of claim 26, wherein the indication transmitted to the second IAB donor CU indicates that communications of the IAB node associated with the second cell will not conflict with communications to be performed with the parent node serving the first cell.

28. The method of claim 26, wherein the parent node serving the first cell is an IAB donor DU associated with the first IAB donor CU or is an IAB node associated with the first IAB donor CU.

29. The method of claim 26, wherein the migration of the IAB node to the parent node serving the first cell is in accordance with a handover for the IAB node, a secondary node change for the IAB node, or a secondary node addition for the IAB node.

30. The method of claim 26, wherein the resource configuration of the second cell further includes one or more of:
  a configuration of synchronization signal block (SSB) transmissions including cell-defining SSBs or an SSB transmission configuration,
  a channel state information reference signal configuration of the second cell,
  a random access channel configuration of the second cell,
  a scheduling request configuration of the second cell,
  a downlink control channel configuration for the second cell,
  a subcarrier spacing for transmissions of the second cell,
  a multiplexing capability of the IAB node associated with cell communication, or
  at least part of a system information block message associated with the second cell.

* * * * *